(12) United States Patent
Barat et al.

(10) Patent No.: US 11,847,018 B2
(45) Date of Patent: Dec. 19, 2023

(54) METHOD FOR UTILITY INFRASTRUCTURE FAULT DETECTION AND MONITORING

(71) Applicant: Gridware Technologies Inc., Walnut Creek, CA (US)

(72) Inventors: Timothy Jonathan Barat, Folsom, CA (US); Zhenhao Chen, Oakland, CA (US); Prabal Dutta, Ann Arbor, MI (US)

(73) Assignee: Gridware Technologies Inc., Walnut Creek, CA (US)

( * ) Notice: Subject to any disclaimer, the term of this patent is extended or adjusted under 35 U.S.C. 154(b) by 0 days.

(21) Appl. No.: 18/163,202

(22) Filed: Feb. 1, 2023

(65) Prior Publication Data

US 2023/0176942 A1     Jun. 8, 2023

Related U.S. Application Data

(63) Continuation of application No. 17/654,988, filed on Mar. 15, 2022, now Pat. No. 11,620,181.

(60) Provisional application No. 63/200,653, filed on Mar. 19, 2021.

(51) Int. Cl.
*G05B 23/02* (2006.01)
*G06F 11/07* (2006.01)

(52) U.S. Cl.
CPC ........ *G06F 11/079* (2013.01); *G05B 23/0218* (2013.01)

(58) Field of Classification Search
None
See application file for complete search history.

(56) References Cited

U.S. PATENT DOCUMENTS 4,926,691 A * 5/1990 Franklin .............. G01N 29/045
                                                        703/2
5,371,540 A   12/1994 Tamura et al.
7,286,812 B2  10/2007 Manis et al.
(Continued)

FOREIGN PATENT DOCUMENTS

WO   WO 2022/198212   9/2022

OTHER PUBLICATIONS

US 11,573,850 B2, 02/2023, Barat et al. (withdrawn)
Miyaoka, English translation of Japanese Patent Publication JP2007010373, published Jan. 18, 2007.

*Primary Examiner* — Bernard G Lindsay
(74) *Attorney, Agent, or Firm* — Levine Bagade Han LLP

(57) ABSTRACT

A method may include obtaining, at a server or analysis device, sensor data comprising at least one of vibration data and impulse data from one or more sensor devices coupled to a first utility infrastructure; obtaining training sensor data associated with at least one of the first utility infrastructure from a previous time period and one or more second utility infrastructures; comparing the sensor data with the training sensor data associated with the at least one of the first utility infrastructure from the previous time period and the one or more second utility infrastructures; and identifying or predicting a fault occurrence associated with the first utility infrastructure based on the comparing the sensor data associated with the first utility infrastructure to the training sensor data associated with the at least one of the first utility infrastructure from the previous time period and the one or more second utility infrastructures.

20 Claims, 11 Drawing Sheets

(56) References Cited

U.S. PATENT DOCUMENTS

| | | |
|---|---|---|
| 9,049,103 B2 | 6/2015 | McHann, Jr. |
| 10,228,278 B2 | 3/2019 | Chen et al. |
| 10,579,777 B2 | 3/2020 | Ziavras et al. |
| 10,637,239 B2 | 4/2020 | Neuenschwander |
| 2004/0054921 A1 | 3/2004 | Land, III |
| 2007/0124619 A1 | 5/2007 | Mizukami et al. |
| 2009/0217758 A1* | 9/2009 | Loeser .................. G01N 29/30 73/573 |
| 2011/0288777 A1 | 11/2011 | Gupta |
| 2011/0313726 A1 | 12/2011 | Parthasarathy et al. |
| 2012/0059604 A1* | 3/2012 | Sheu ...................... G01H 11/02 702/56 |
| 2012/0169842 A1 | 7/2012 | Chuang et al. |
| 2013/0250339 A1 | 9/2013 | Ming |
| 2014/0069192 A1* | 3/2014 | Bartuli .................. G01N 29/12 73/579 |
| 2014/0278150 A1 | 9/2014 | Baesler et al. |
| 2017/0102234 A1 | 4/2017 | Oshetski et al. |
| 2017/0227596 A1 | 8/2017 | Sozer et al. |
| 2018/0217103 A1 | 8/2018 | Someda et al. |
| 2018/0275199 A1 | 9/2018 | Parkin |
| 2020/0160195 A1 | 5/2020 | Strharsky et al. |
| 2020/0293032 A1 | 9/2020 | Wang et al. |
| 2020/0332775 A1 | 10/2020 | Nielsen et al. |
| 2020/0340951 A1* | 10/2020 | Al-Buraik ............ G01N 29/348 |
| 2020/0409323 A1 | 12/2020 | Spalt et al. |
| 2021/0080514 A1 | 3/2021 | Beaudet et al. |
| 2022/0034847 A1 | 2/2022 | Spencer et al. |
| 2022/0300363 A1 | 9/2022 | Barat et al. |

\* cited by examiner

METHOD FOR UTILITY INFRASTRUCTURE
FAULT DETECTION AND MONITORING

CROSS-REFERENCE TO RELATED APPLICATION

This application is a continuation of U.S. patent application Ser. No. 17/654,988 filed on Mar. 15, 2022, which claims the benefit of U.S. Provisional Application No. 63/200,653 filed on Mar. 19, 2021, the contents of which are incorporated herein by reference in their entireties.

TECHNICAL FIELD

The present disclosure generally relates to the field of utility infrastructure management and, more specifically, to fault detection and monitoring for utility infrastructure.

BACKGROUND

Utility infrastructure may facilitate transportation of energy, such as electricity, to a number of destinations. Utility infrastructure may include telecommunications structures, such as cell towers and telephone poles; electricity infrastructure, such as electricity towers and power lines; and/or energy infrastructure, such as gas pipelines, solar panels, windmills, etc. Utility infrastructure may be adversely affected by extreme weather conditions and/or accidents caused by humans. In some circumstances, such extreme weather conditions and/or human-caused accidents may damage utility infrastructure, which may cause additional damage to an area around the damaged utility infrastructure. In addition, utility infrastructure may deteriorate over time, for example, according to its expected lifespans. In some circumstances, the deterioration of utility infrastructure may be accelerated by various environmental factors, such as moisture or extreme temperatures.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, sensor data may be obtained from one or more sensors associated with utility infrastructure. The sensor data associated with the utility infrastructure may be compared to training sensor data associated with one or more utility infrastructures. Identification and/or prediction of one or more faults occurrence associated with the utility infrastructure may be accomplished based on the comparing the sensor data associated with the utility infrastructure to the training sensor data associated with the one or more utility infrastructures, utility infrastructure models, and/or utility infrastructure simulations. The sensor data and information about the associated fault occurrences may be stored and/or transmitted to a data storage. A message describing the faults of the utility infrastructure and/or summarizing the condition of the utility infrastructure may be transmitted to a supervising user.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

In some embodiments, a method comprises: obtaining, at a server or an analysis device, sensor data including at least one of vibration data and impulse data from one or more sensor devices coupled to a first utility infrastructure; obtaining training sensor data associated with at least one of the first utility infrastructure from a previous time period and one or more second utility infrastructures; comparing the sensor data with the training sensor data associated with the at least one of the first utility infrastructure from the previous time period and the one or more second utility infrastructures; identifying or predicting a fault occurrence associated with the first utility infrastructure based on the comparing the sensor data associated with the first utility infrastructure to the training sensor data associated with the at least one of the first utility infrastructure from the previous time period and the one or more second utility infrastructures; and transmitting a message describing the fault occurrence of the first utility infrastructure or summarizing a condition of the first utility infrastructure from the server or the analysis device to a computing device.

In some embodiments, the method further comprises determining a normal operating condition for the first utility infrastructure based on the comparing the sensor data associated with the first utility infrastructure to the training sensor data associated with the at least one of the first utility infrastructure from the previous time period and the one or more second utility infrastructures.

In some embodiments, the fault occurrence includes at least one of damage to a component associated with the first utility infrastructure and environmental damage near the first utility infrastructure.

In some embodiments, the fault occurrence is caused by at least one of physical contact between one or more objects and the first utility infrastructure.

In some embodiments, the fault occurrence is caused by high-voltage arcing occurring at the first utility infrastructure.

In some embodiments, the fault occurrence is caused by break-out of a fire near the first utility infrastructure.

In some embodiments, the fault occurrence includes a deterioration of the first utility infrastructure, wherein the vibration data obtained from the one or more sensor devices includes a present first oscillatory pattern of the first utility infrastructure due to current flowing through channels supported by or otherwise coupled to the first utility infrastructure, wherein the training sensor data includes at least one of a previous first oscillatory pattern of the first utility infrastructure due to current flowing through the channels obtained during the previous time period, a present second oscillatory pattern of a second utility infrastructure due to current flowing through channels supported by or otherwise coupled to the second utility infrastructure, and a previous second oscillatory pattern of the second utility infrastructure due to current flowing through channels supported by or otherwise coupled to the second utility infrastructure obtained during the previous time period, and wherein the fault occurrence is identified or predicted when the present first oscillatory pattern is attenuated in comparison to at least one of the previous first oscillatory pattern, the present second oscillatory pattern, and the previous second oscillatory pattern.

In some embodiments, the first utility infrastructure is made in part of wood and wherein the deterioration of the first utility infrastructure is caused by at least one of heart rot, shell rot, rot caused by an inset or animal, and termite damage of the wood making up at least part of the first utility infrastructure.

In some embodiments, the fault occurrence includes a deterioration of the first utility infrastructure, wherein the vibration data obtained from the one or more sensor devices includes a present first oscillatory pattern of the first utility infrastructure in response to rain or wind affecting the first utility infrastructure, wherein the training sensor data includes at least one of a previous first oscillatory pattern of the first utility infrastructure in response to rain or wind affecting the first utility infrastructure during the previous time period and obtained during the previous time period, a present second oscillatory pattern of a second utility infrastructure in response to rain or wind affecting the second utility infrastructure, and a previous second oscillatory pattern of the second utility infrastructure in response to rain or wind affecting the second utility infrastructure during the previous time period and obtained during the previous time period, and wherein the fault occurrence is identified or predicted when the present first oscillatory pattern is attenuated in comparison to at least one of the previous first oscillatory pattern, the present second oscillatory pattern, and the previous second oscillatory pattern.

In some embodiments, the sensor data further includes at least one of structure-orientation data, gyration data, temperature data, humidity data, atmospheric pressure data, precipitation data, wind velocity data, smoke density data, particulate matter data, gas composition data, magnetic field data, electric field data, microwave radiation data, infrared radiation data, ultraviolet radiation data, visible luminosity data, electromagnetic spectroscopy data, mechanical spectroscopy data, audio data, image data, and video data relating to the utility infrastructure.

In some embodiments, each of the one or more sensor devices includes at least one of a vibrometer, an accelerometer, a gyroscope, an acoustic microphone, a video camera, an ambient temperature sensor, a barometer, a hygrometer, a magnetometer, a smoke detector, a visible light meter or photometer, an ultraviolet (UV) light detector, an infrared (IR) light detector, an anemometer or wind sensor, a particulate meter or counter, an electrometer, a multi-field electromagnetic field (EMF) meter, a radio frequency (RF) meter, and a spectrometer.

In some embodiments, the fault occurrence of the first utility infrastructure is identified or predicted by at least one of analog signal processing and digital signal processing of the sensor data and the training sensor data and comparing the processed sensor data against the processed training sensor data.

In some embodiments, the fault occurrence of the first utility infrastructure is identified or predicted by feeding the sensor data to at least one of a supervised learning model and an unsupervised learning model and obtaining a prediction from the at least one of the supervised learning model and the unsupervised learning model concerning the fault occurrence, and wherein the supervised learning model and the unsupervised learning models are trained using the training sensor data.

In some embodiments, each of the one or more sensor devices is coupled to the first utility infrastructure at a position at least 3.0 meters above ground level.

In some embodiments, each of the one or more sensor devices is coupled to the first utility infrastructure via a bracket fixedly fastened to an exterior side of the first utility infrastructure, and wherein at least one of a vibration and impulse sustained by the first utility infrastructure or a channel supported by or coupled to the first utility infrastructure is passed through the first utility infrastructure via the bracket to each of the one or more sensor devices.

In some embodiments, disclosed is a system comprising: one or more sensor devices coupled to a first utility infrastructure, the sensor devices including: an enclosure; one or more internal sensors positioned inside of the enclosure and one or more external sensors positioned at least partly outside of the enclosure; one or more antennae; and one or more energy-storage features; one or more processors of a server or analysis device; and one or more non-transitory computer-readable storage media of the server or analysis device configured to store instructions that, in response to being executed, cause the one or more processors to perform operations, the operations including: obtaining sensor data including at least one of vibration data and impulse data from one or more sensor devices coupled to a first utility infrastructure; obtaining training sensor data associated with at least one of the first utility infrastructure from a previous time period and one or more second utility infrastructures; comparing the sensor data with the training sensor data associated with the at least one of the first utility infrastructure from the previous time period and the one or more second utility infrastructures; identifying or predicting a fault occurrence associated with the first utility infrastructure based on the comparing the sensor data associated with the first utility infrastructure to the training sensor data associated with the at least one of the first utility infrastructure from the previous time period and the one or more second utility infrastructures; and transmitting a message, to a computing device, describing the fault occurrence of the first utility infrastructure or summarizing a condition of the first utility infrastructure.

In some embodiments, the fault occurrence includes a deterioration of the first utility infrastructure, wherein the vibration data obtained from the one or more sensor devices includes a present first oscillatory pattern of the first utility infrastructure due to current flowing through channels supported by or coupled to the first utility infrastructure, wherein the training sensor data includes at least one of a previous first oscillatory pattern of the first utility infrastructure due to current flowing through the channels obtained during the previous time period, a present second oscillatory pattern of a second utility infrastructure due to current flowing through channels supported by or coupled to the second utility infrastructure, and a previous second oscillatory pattern of the second utility infrastructure due to current flowing, obtained during the previous time period, through channels supported by or coupled to the second utility infrastructure, and wherein the fault occurrence is identified or predicted when the present first oscillatory pattern is attenuated in comparison to at least one of the previous first oscillatory pattern, the present second oscillatory pattern, and the previous second oscillatory pattern.

In some embodiments, the first utility infrastructure is made in part of wood and wherein the deterioration of the first utility infrastructure is caused by at least one of heart rot, rot caused by an inset or animal, and termite damage of the wood making up at least part of the first utility infrastructure.

In some embodiments, the fault occurrence includes a deterioration of the first utility infrastructure, wherein the vibration data obtained from the one or more sensor devices includes a present first oscillatory pattern of the first utility infrastructure in response to rain or wind affecting the first utility infrastructure, wherein the training sensor data includes at least one of a previous first oscillatory pattern of the first utility infrastructure in response to rain or wind affecting the first utility infrastructure during the previous time period and obtained during the previous time period, a present second oscillatory pattern of a second utility infrastructure in response to rain or wind affecting the second utility infrastructure, and a previous second oscillatory pattern of the second utility infrastructure in response to rain or wind affecting the second utility infrastructure during the previous time period and obtained during the previous time period, and wherein the fault occurrence is identified or predicted when the present first oscillatory pattern is attenuated in comparison to at least one of the previous first oscillatory pattern, the present second oscillatory pattern, and the previous second oscillatory pattern.

In some embodiments, disclosed are one or more non-transitory computer-readable storage media configured to store instructions that, in response to being executed, cause one or more processors to perform operations, the operations including: obtaining sensor data including at least one of vibration data and impulse data from one or more sensor devices coupled to a first utility infrastructure; obtaining training sensor data associated with at least one of the first utility infrastructure from a previous time period and one or more second utility infrastructures; comparing the sensor data with the training sensor data associated with the at least one of the first utility infrastructure from the previous time period and the one or more second utility infrastructures; identifying or predicting a fault occurrence associated with the first utility infrastructure based on the comparing the sensor data associated with the first utility infrastructure to the training sensor data associated with the at least one of the first utility infrastructure from the previous time period and the one or more second utility infrastructures; and transmitting a message describing the fault occurrence of the first utility infrastructure or summarizing a condition of the first utility infrastructure.

BRIEF DESCRIPTION OF THE DRAWINGS

Example embodiments will be described and explained with additional specificity and detail through the accompanying drawings in which.

DETAILED DESCRIPTION

Damage to utility infrastructure may cause localized and/or widespread harm to property, people, and/or the environment. For example, damage to electricity distribution systems may lead to forest fires, destruction of nearby structures, and/or pose electrocution risks to passing humans. A utility company may be incapable of or slow to identify the cause of the damage to the utility infrastructure. In such cases, the utility company may decide to de-energize large portions of the utility infrastructure as a preventative measure. The utility company may also be unable to predict which situations warrant shutting off the utility infrastructure ahead of time. The inability to ascertain when damage to the utility infrastructure is likely and/or the extent of the damage to the utility infrastructure may adversely affect those relying on the utility infrastructure.

The embodiments described in the present disclosure may relate to, among other things, a method of monitoring and assessing the condition of utility infrastructure and facilitate more accurate prediction and/or assessment of damage to utility infrastructure. In some embodiments, sensor data may be obtained from one or more sensors associated with the utility infrastructure. The sensor data may be analyzed to identify and/or predict one or more faults of the utility infrastructure. An alert message describing the predicted faults of the support structure may be generated and sent to a user and/or an automated system in control of the utility infrastructure.

Embodiments of the present disclosure are explained with reference to the accompanying figures.

Figure 1A:
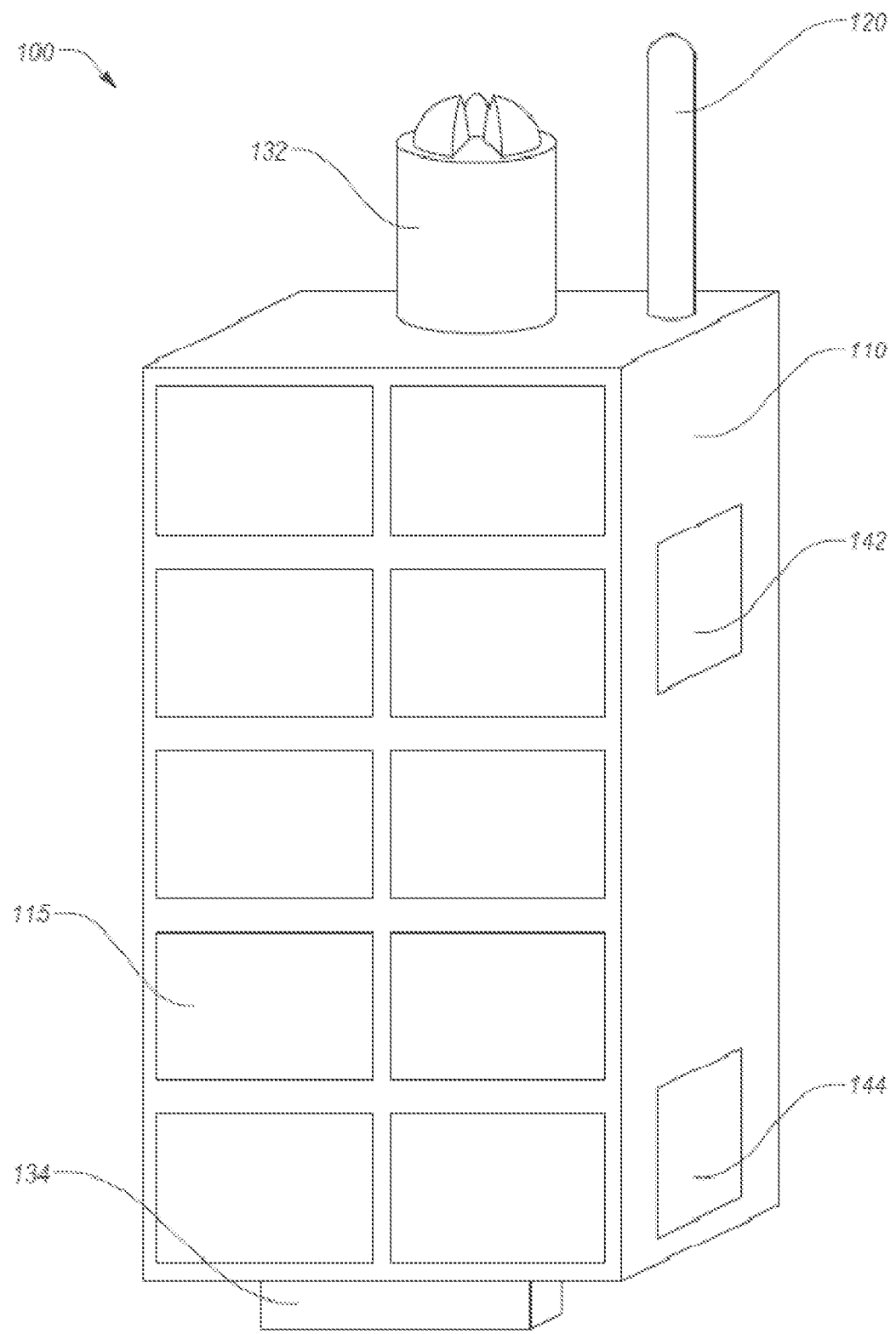
FIG. 1A illustrates a perspective view of an example embodiment of a sensor device according to the present disclosure.

FIG. 1A illustrates a perspective view of an example embodiment of a sensor device 100 according to the present disclosure. The sensor device 100 may include an enclosure 110. In some embodiments, the sensor device 100 may include one or more solar cells 115. As illustrated, in some aspects, the solar cells 115 may be positioned on one or more surfaces of the enclosure 110, although other mounting configurations may be implemented. In these and other embodiments, the sensor device 100 may include one or more antennae 120, sensors (e.g., a wind sensor 132 and/or environmental sensors 134), one or more built-in cameras 142, and/or one or more microphones 144.

One or more sensors, batteries, and/or other components may be positioned at least partially inside of the enclosure 110. The enclosure 110 may protect components that may be unsuited to weather exposure. In some embodiments, the enclosure 110 may be made of a material capable of withstanding typical weather conditions and/or extreme weather conditions without exposing components included in the enclosure 110 to such weather conditions. For example, the enclosure 110 may be made of polyvinyl chloride, low density polyethylene, etc. In addition, for example, the enclosure 110 may be made of a metal, such as stainless steel, cast iron, aluminum, etc. Also, for example, the enclosure 110 may be made of carbon fiber or other material.

In some embodiments, the enclosure 110 may be shaped such that the enclosure 110 may be attached to utility infrastructure and/or support structures for the utility infrastructure. For example, the shape of the enclosure 110 may correspond to a component of the utility infrastructure and/or may correspond to the shape of a support structure.

One or more external sensors and/or other components may be positioned at least partially outside of the enclosure 110, for example, on one or more outer surfaces of the enclosure 110. Such components may not require protection of the enclosure 110, for example, from weather exposure or other considerations.

In some embodiments, the solar cells 115 may be attached to one or more of the surfaces of the enclosure 110. The solar cells 115 may generate and/or store energy to be supplied to one or more components of the sensor device 100, such as the sensors and/or the battery. Additionally or alternatively, the sensor device 100 may include other energy generation features and/or energy storage features, such as rechargeable lithium-ion batteries. Additionally or alternatively, the sensor device 100 may be coupled to the utility infrastructure such that the sensor device 100 obtains energy from the utility infrastructure.

The sensor device 100 may include one or more antennae 120 and/or sensors attached to the enclosure 110 capable of communicating via cellular signals, radio signals, Bluetooth signals, Wi-Fi signals, and/or other forms of signaling. The antennae 120 may be communicatively coupled to a utility network such that a user may monitor activity and/or sensor data collected by the sensor device 100. In some embodiments, the antennae 120 may transmit collected sensor data to a server, such as a cloud server, for data analysis as described in further detail below in relation to FIG. 4.

Some of the sensors may be positioned exterior of the enclosure such as any sensors that benefit from being positioned on an exterior surface of the enclosure 110 rather than inside of the enclosure 110. In these and other embodiments, data collection may be facilitated and/or made more accurate by positioning some sensors on the exterior surface of the enclosure 110. Additionally or alternatively, the sensors may be attached at a first location on the utility infrastructure while being communicatively coupled to a sensor device 100 attached at a second location on the utility infrastructure.

In some embodiments, the sensor data collected by the wind sensor 132 and/or the environmental sensors 134 may be analyzed to determine weather conditions experienced at a given location and/or time by measuring parameters including temperature, humidity, air pressure, solar intensity, wind velocity, smoke density, etc. The sensor data relating to weather conditions may be organized with respect to location and/or time to analyze the weather around a utility infrastructure system. In these and other embodiments, averaging the weather-related sensor data for a number of sensor devices 100 in a given area may improve detection and mapping of microclimates experienced by one or more of the sensor devices 100, which may facilitate pinpointing of non-uniform equipment degradation and irregular load behaviors. Additionally or alternatively, analysis of weather-related sensor data may facilitate making better-informed decisions regarding operations of the utility infrastructure.

In some embodiments, the sensor device 100 may be configured to perform preliminary processing and/or verification of the collected sensor data before transmitting the sensor data for further analysis. For example, the sensor device 100 may include the cameras 142 and/or the microphones 144, which may capture image and/or audio data, respectively, relating to the utility infrastructure. In some embodiments, the sensor device 100 may be configured to capture the image and/or audio data in response to sensor data collected by the wind sensor 132 and/or one or more of the environmental sensors 134 exceeding a given threshold, falling below a given threshold, equaling a given value, following a given trend, displaying a predetermined pattern, etc. In these and other embodiments, the captured image and/or audio data may be transmitted to a user and/or computing device for fault-occurrence verification and/or analysis.

Figure 1B:
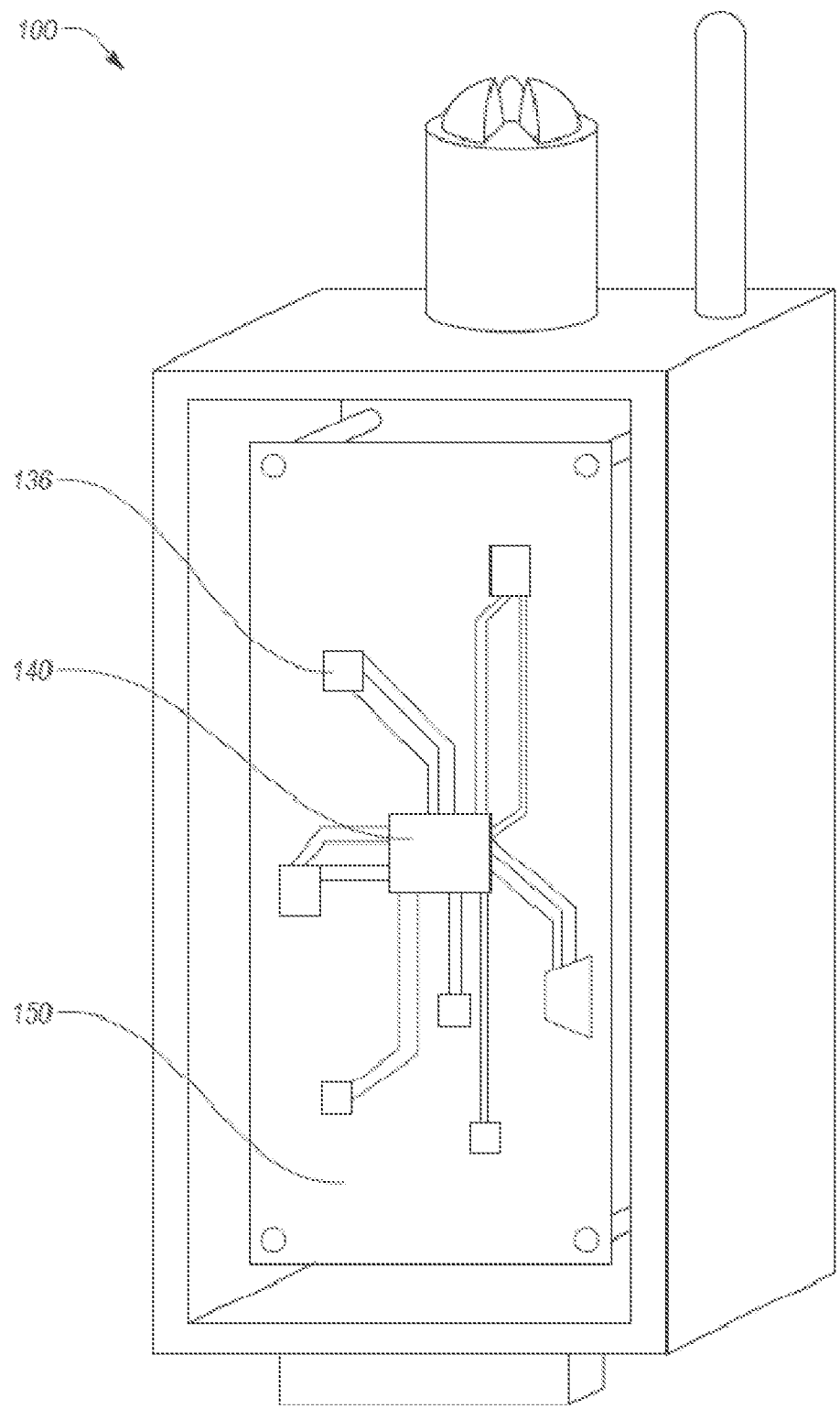
FIG. 1B illustrates a perspective view of the example embodiment of the sensor device with part of an enclosure removed for ease of viewing.

FIG. 1B illustrates a perspective view of the example embodiment of the sensor device 100 according to the present disclosure. In FIG. 1B, a portion of the enclosure 110 is not shown to illustrate components of the sensor device 100 that may be included inside of the enclosure 110. In some embodiments, one or more internal sensors 136 and/or one or more batteries 140 may be included inside of the enclosure 110. In these and other embodiments, the internal sensors 136, the environmental sensors 134, and/or the one or more batteries 140 may be coupled to a circuit board 150.

In some embodiments, the internal sensors 136 may comprise a 3-axis accelerometer, a gyroscope (e.g., a 3-axis gyroscope), a vibrometer, a magnetometer (e.g., a multi-axis magnetometer), an electrometer, an electromagnetic field (EMF) meter (e.g., a multi-field EMF meter), a radio frequency (RF) meter, a spectrometer, or a combination thereof. In these and other embodiments, the environmental sensors 134 may comprise an ambient temperature sensor, a barometer, a hygrometer, a smoke detector, a visible light meter, an ultraviolet (UV) light detector, an infrared (IR) light detector, an anemometer or wind sensor, a particulate meter/counter, or a combination thereof. Although FIGS. 1A and 1B show the environmental sensors 134 as being separate from the internal sensors 136, it is contemplated by this disclosure and it should be understood by one of ordinary skill in the art that any of the environmental sensors 134 can also be positioned or housed within the enclosure 110 and that any of the internal sensors 136 can be positioned or located, at least partly, outside of the enclosure 110.

As will be discussed in more detail in later sections, the environmental sensors 134, the wind sensor 132, the internal sensors 136, the built-in cameras 142, and the acoustic microphones 144 can work together to measure and monitor various conditions and states of the utility infrastructure 200 in response to any external forces applied to the utility infrastructure 200, any weather-related phenomena near the utility infrastructure 200, any weather-related or fire-related damage to a surrounding environment (including trees and other plant matter or vegetation) near the utility infrastructure 200, any spontaneous electrical events (e.g., high-voltage arcing) occurring at or near the utility infrastructure 200, any geologic events occurring near the utility infrastructure 200, and/or any internal damage or deterioration sustained by the utility infrastructure 200.

In some embodiments, a number of sensor devices 100 may be positioned on various support structures and/or components of the utility infrastructure to facilitate sensor data collection focused on the various support structures and/or components (e.g., sensor data collection focused on a given transformer attached to an electricity pole). In these and other embodiments, the accelerometer may measure vibrations experienced by the sensor device 100, which may be correlated to vibrations experienced by the utility infrastructure and/or associated support structures. Additionally or alternatively, a gyroscope may measure orientation and/or changes to the orientation of the sensor device 100 to assess positioning of the utility infrastructure and/or support structures. The sensor data collected by the internal sensors 136 may be sent to a server to analyze the conditions of the utility infrastructure. In some embodiments, the sensor data may be tagged with location information and/or time information such that data trends between geographic regions and/or over one or more periods of time may be established. In some embodiments, the sensor device 100 may be configured to capture image and/or audio data in response to the sensor data collected by the internal sensors 136 exceeding a given threshold, falling below a given threshold, equaling a given value, following a given trend, displaying a predetermined pattern, etc. as described above in relation to FIG. 1A.

In some embodiments, the internal sensors 136 may include one or more tactile switches to prevent physical tampering with the sensor device 100. The tactile switches may include a first setting indicating the sensor device 100 is secure and a second setting indicating the sensor device 100 is compromised. In some embodiments, the tactile switches may be engaged in the first setting when the sensor device 100 is coupled to the utility infrastructure, the enclosure 110 is securely closed, the battery 140 is operational, and/or other operating conditions are satisfied. Responsive to physical tampering with the sensor device 100, the tactile switches may engage in the second setting. In these and other embodiments, the tactile switches being engaged in the second setting may trigger transmission of sensor data indicating the sensor device 100 is compromised.

In some embodiments, the sensor device 100 may include the battery 140 to provide a source of backup energy in the event the solar cells 115 fail to function. In some embodiments, the battery 140 may be coupled to the solar cells 115 such that the solar cells 115 provide energy to the battery 140 during normal operations of the sensor device 100. Responsive to failure of the solar cells 115, the battery 140 may provide energy to the sensor device 100. In these and other embodiments, the sensor device 100 may include a number of batteries 140 and/or a type of batteries such that the backup energy provided by the batteries 140 lasts for a given duration of time (e.g., the sensor device 100 may be powered by the batteries 140 for one day, one week, two weeks, etc.).

Figure 1C:
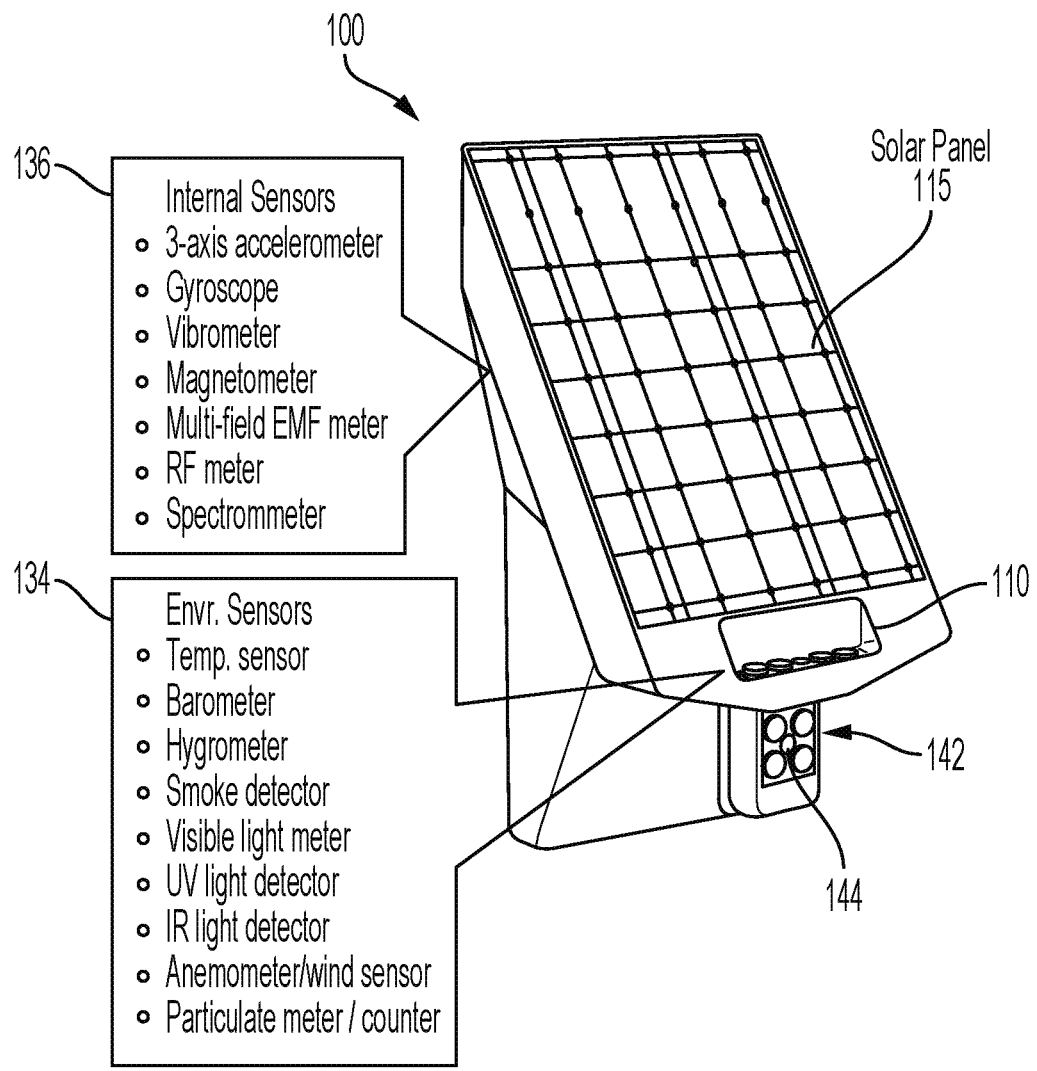
FIG. 1C illustrates a perspective view of another example embodiment of the sensor device.

FIG. 1C illustrates a perspective view of another example embodiment of the sensor device 100. The sensor device 100 may operate the same as the sensor devices 100 shown in FIGS. 1A-1B. The sensor device 100 may include a UV-resistant polymer-based enclosure 110. For example, the enclosure 110 may be made of polyvinyl chloride, low density polyethylene, etc. In addition, for example, the enclosure 110 may be made of a metal, such as stainless steel, cast iron, aluminum, etc. Also, for example, the enclosure 110 may be made of carbon fiber or other material.

In some embodiments, the sensor device 100 may include one or more solar cells or a solar panel 115. As shown in FIG. 1C, the solar cells or solar panel 115 may be tilted or angled so the solar cells or the solar panel 115 catches more sunlight. At least part of the enclosure 110 may be configured or otherwise designed as an angled support structure for the solar cells or the solar panel 115.

In some embodiments, the solar panel 115 may be made in part of polycrystalline photovoltaic solar cells. For example, the solar panel 115 can be a 3 W polycrystalline photovoltaic solar panel.

The solar cells 115 or the solar panel 115 may generate and/or store energy to be supplied to one or more components of the sensor device 100, such as the sensors and/or the battery 140. Additionally or alternatively, the sensor device 100 may include other energy generation features and/or energy storage features, such as rechargeable lithium-ion batteries. In some embodiments, the battery 140 may be a rechargeable lithium iron phosphate (LiFePO$_4$) battery. In these and other embodiments, the battery 140 may be a 32 watt-hour high-capacity battery.

Additionally or alternatively, the sensor device 100 may be coupled to the utility infrastructure such that the sensor device 100 obtains energy from the utility infrastructure.

In these and other embodiments, the sensor device 100 may include one or more antennae, internal sensors 136 and environmental sensors 134, one or more built-in cameras 142, and/or one or more acoustic microphones 144.

In some embodiments, the internal sensors 136 can comprise a 3-axis accelerometer, a gyroscope (e.g., a 3-axis gyroscope), a vibrometer, a magnetometer (e.g., a multi-axis magnetometer), an electrometer, an electromagnetic field (EMF) meter (e.g., a multi-field EMF meter), a radio frequency (RF) meter, a spectrometer, or a combination thereof. In these and other embodiments, the environmental sensors 134 can comprise an ambient temperature sensor, a barometer, a hygrometer, a smoke detector, a visible light meter, an ultraviolet (UV) light detector, an infrared (IR) light detector, an anemometer or wind sensor, a particulate meter/counter, or a combination thereof. Although FIG. 1C shows the environmental sensors 134 as being separate from the internal sensors 136, it is contemplated by this disclosure and it should be understood by one of ordinary skill in the art that any of the environmental sensors 134 can also be positioned or housed within the enclosure 110 and that any of the sensors listed under internal sensors 136 in FIG. 1C can be positioned or located, at least partly, outside of the enclosure 110.

The environmental sensors 134, the internal sensors 136, the built-in cameras 142, and the acoustic microphones 144 can work together to measure and monitor various conditions and states of the utility infrastructure 200 in response to any external forces applied to the utility infrastructure 200, any weather-related phenomena near the utility infrastructure 200, any weather-related or fire-related damage to a surrounding environment (including trees and other plant matter or vegetation) near the utility infrastructure 200, any spontaneous electrical events (e.g., high-voltage arcing) occurring at or near the utility infrastructure 200, any geologic events occurring near the utility infrastructure 200, and/or any internal damage or deterioration sustained by the utility infrastructure 200.

In some embodiments, the battery 140 may be included inside of the enclosure 110. In these and other embodiments, the internal sensors 136, the environmental sensors 134, and/or the battery 140 may be coupled to a printed or flexible circuit board (e.g., the circuit board 150, not shown in FIG. 1C).

In some embodiments, the sensor device 100 may include one or more tactile switches to prevent physical tampering with the sensor device 100. The tactile switches may include a first setting indicating the sensor device 100 is secure and a second setting indicating the sensor device 100 is compromised. In some embodiments, the tactile switches may be engaged in the first setting when the sensor device 100 is coupled to the utility infrastructure, the enclosure 110 is securely closed, the battery 140 is operational, and/or other operating conditions are satisfied. Responsive to physical tampering with the sensor device 100, the tactile switches may engage in the second setting. In these and other embodiments, the tactile switches being engaged in the second setting may trigger transmission of sensor data indicating the sensor device 100 is compromised.

Figure 1D:
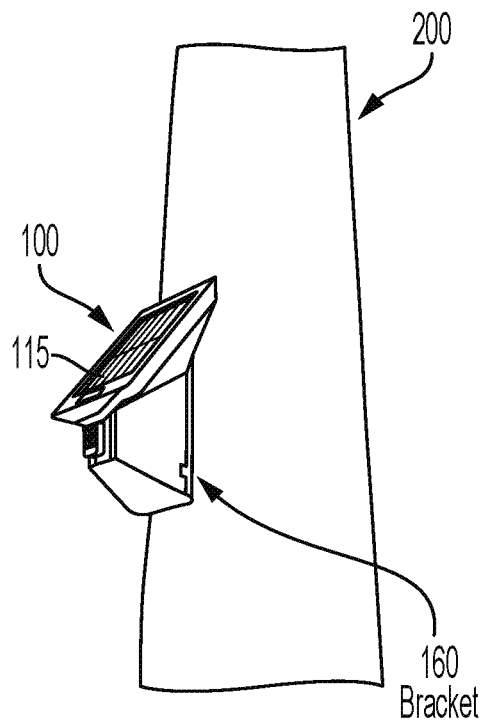
FIG. 1D illustrate the sensor device of FIG. 1C coupled to an embodiment of a utility infrastructure.
Figure 1E:
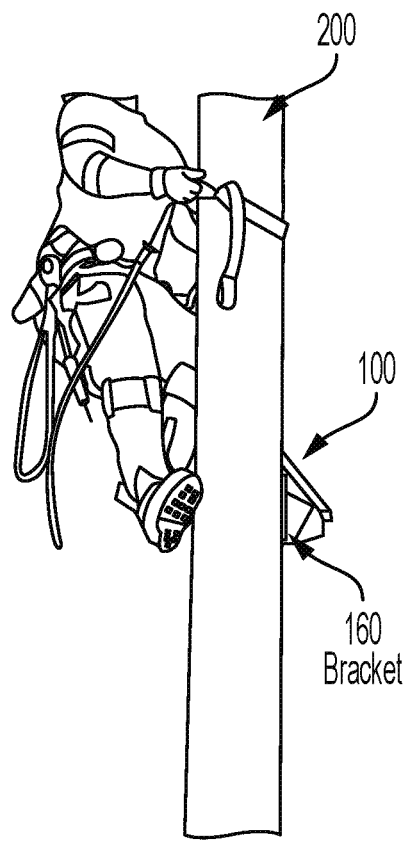
FIG. 1E illustrate the sensor device of FIG. 1C coupled to another embodiment of a utility infrastructure.
Figure 1F:
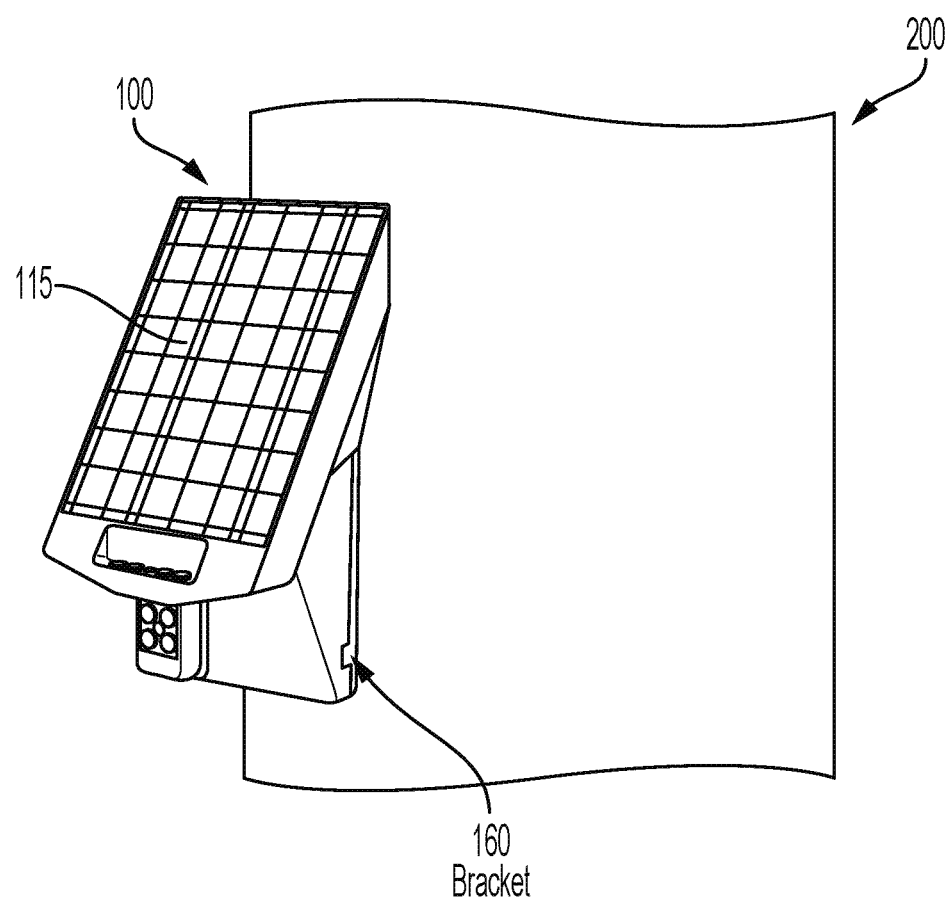
FIG. 1F illustrate the sensor device of FIG. 1C coupled to yet another embodiment of a utility infrastructure.

FIGS. 1D-1F illustrate the sensor device 100 coupled to an embodiment of a utility infrastructure 200. As shown in FIGS. 1D-1F, the utility infrastructure 200 may be or comprise a wooden utility pole (e.g., an electrical utility pole) or power pole.

As will be discussed in more detail in later sections, when the utility infrastructure 200 is made, at least in part, of wood, the utility infrastructure 200 (e.g., a wooden utility pole or power pole) can be subject to deterioration or weakening as a result of rot or decay. For example, the utility infrastructure 200 can undergo or be subject to deterioration as a result of heart rot, shell rot, rot caused by an inset or animal, and/or termite damage. Heart rot is a fungal disease that causes the decay of wood at the center (what is known as the heartwood). Shell rot is a decay or softening of the outer portion of the wood surrounding the heartwood (known as the sapwood). Wooden utility poles or power poles can be subject to external decay (shell rot), internal decay (heart rot), or insect damage along portions of the wood not treated with preservatives or sealant or where the preservative or sealant has been removed due to cracks, cuts or holes drilled into the wood.

As shown in FIGS. 1D-1F, the sensor device 100 can be coupled to the utility infrastructure 200 (e.g., the utility pole) via a bracket 160 fixedly fastened or attached to an exterior side of the utility infrastructure 200. As will be discussed in more detail in later sections, a vibration or impulse sustained by the utility infrastructure 200 or one or more channels 200 (e.g., power lines) coupled to and supported by the utility infrastructure 200 can be passed through the utility infrastructure 200 via the bracket 160 to be detected by the sensor device 100.

For example, the bracket 160 can be fastened or otherwise attached to the exterior side of the utility infrastructure via fasteners, screws, and/or bolts. Once the bracket 160 is securely fastened or attached to the exterior side of the utility infrastructure 200, the sensor device 100 can be detachably coupled to the bracket 160, for example, by sliding a part of the enclosure 110 on to the bracket 160 via an interlocking mechanism, a latch mechanism, and/or an interference fit. In other embodiments, the sensor device 100 can be fastened to the bracket 160 via fasteners or other types of mechanical couplers.

The sensor device 100 can be coupled to the utility infrastructure 200 at a position at least 3.0 meters above ground level. (e.g., 3.5 meters to 4.5 meters above ground level). In some embodiments, the sensor device 100 can be coupled to the utility infrastructure 200 along an upper or vertically upper half of the utility infrastructure 200. In other embodiments, the sensor device 100 can be coupled to the utility infrastructure 200 at a halfway point or vertical halfway point along the utility infrastructure 200. In all such embodiments, the sensor device 100 is coupled to the utility infrastructure 200 at least 3.0 meters above ground level.

One technical problem faced by the applicants is how to couple the sensor device 100 to the utility infrastructure 200 such that enough of the vibrations and/or impulses sustained by the utility infrastructure 200 and enough of the environmental influences affecting the utility infrastructure 200 is detectable by the sensor device 100 to a degree that can aid in fault detection. One technical solution discovered and developed by the applicants is to couple the sensor device 100 to the utility infrastructure 200 at a position along an exterior side of the utility infrastructure 200 at least 3.0 meters above ground level. The sensor device 100 can be coupled to the utility infrastructure 200 via a bracket 160 securely fastened to the exterior side of the utility infrastructure.

Figure 2:
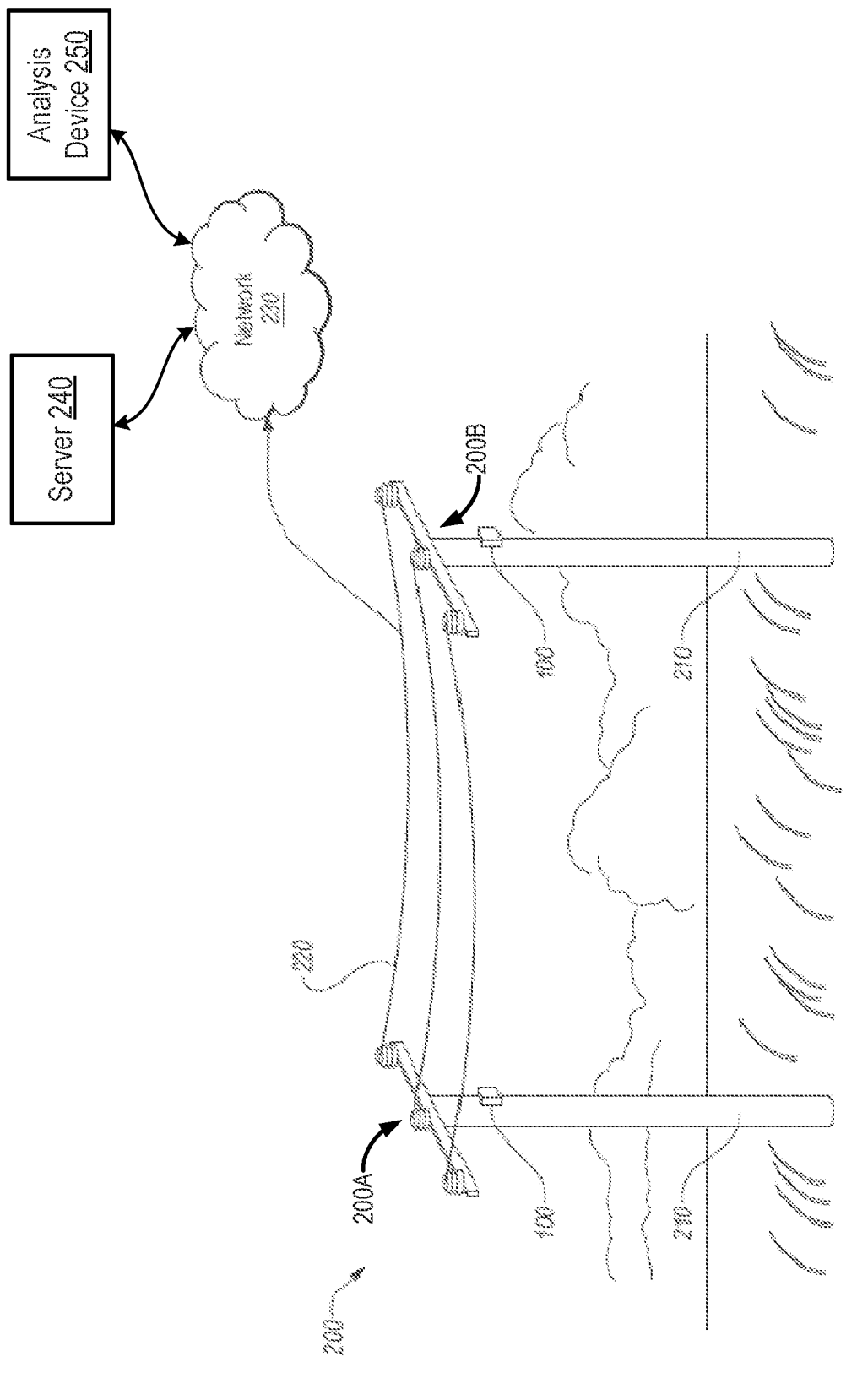
FIG. 2 illustrates a plurality of utility infrastructures having sensor devices coupled to such utility infrastructures.

FIG. 2 illustrates a plurality of utility infrastructures 200 including a first utility infrastructure 200A and a second utility infrastructure 200B. Each of the utility infrastructures 200 can have at least one sensor device 100 coupled to the utility infrastructure 200. The sensor 100 shown in FIG. 2 can represent any of the sensor devices 100 depicted in FIGS. 1A-1F.

For purposes of this disclosure, any references to the utility infrastructure 200 (including any of the first utility infrastructure 200A, the second utility infrastructure 200B, etc.) may refer to a support structure 210, such as a utility or electrical pole, a cell tower, etc., used to support certain utility equipment and/or communication equipment. Moreover, any references to the utility infrastructure 200 (including any of the first utility infrastructure 200A, the second utility infrastructure 200B, etc.) may refer to channels 220 (e.g., power lines, communication lines, etc.) supported by and coupled to the support structure 210, which may transmit electricity, communication signals, etc. For example, the channels 220 may include power lines of an electricity transport system. In some embodiments, sensor data collected by the sensor devices 100 may be transmitted to a server 240, an analysis device 250, or a combination thereof via a wireless communication network 230 (see also, FIG. 4).

In some embodiments, the sensor device 100 may be coupled to the support structure 210. For example, the sensor device 100 may be coupled to the support structure 210 such that the sensor device 100 is positioned above ground level relative to a base of the support structure 210. As previously discussed, the sensor device 100 may be coupled to the support structure 210 at a position along an exterior side of the support structure 210 at least 3.0 meters above ground level. The sensor device 100 may be coupled to the support structure 210 via a bracket 160 (not shown in FIG. 2, see FIGS. 1D-1F).

In some embodiments, the sensor device 100 may be positioned at the top of the support structure 210.

Sensor data collected at different positions along the support structure 210 may differ depending on positioning of the sensor device 100. For example, vibration data may differ in terms of vibration frequency, intensity of vibrations, timing of vibration occurrence, etc. In these and other embodiments, a plurality of sensor devices 100 may be coupled to the same support structure 210 such that varying quantities and qualities of sensor data may be collected to improve detection frequency, analysis accuracy of the sensor data, etc.

Although not shown in FIG. 2, it is contemplated by this disclosure that the sensor device 100 may be coupled to the channels 220 of the utility infrastructure 200. For example, the sensor device 100 may be coupled to one or more of the power lines. In such an example, the sensor device 100 may be configured to detect vibrations along the power lines, vibrations due to current flowing through the power lines, and/or other metrics that may indicate operability of the power lines.

In embodiments where the utility infrastructure 200 is part of an electrical utility system, current flowing through channels 220 coupled to a support structure 210 can cause the support structure 210 or other components of the utility infrastructure 200 to vibrate. These vibrations can propagate to a sensor device 100 attached, affixed, or otherwise coupled to the support structure 210 such that such vibrations can be detected by at least the internal sensors 136 of the sensor device 100 in the form of vibration data. As will be discussed in more detail in later sections, at least one of the server 240 and the analysis device 250 can identify and predict a fault occurrence associated with the utility infrastructure 200 by comparing the vibration data (along with other sensor data) collected by the sensor device 100 coupled to the utility infrastructure 200 against other vibration data/sensor data collected by other sensor devices 100 coupled to other utility infrastructures 200.

In some embodiments, the sensor data collected by the sensor devices 100 may be transmitted to the server 240 and/or the analysis device 250 via the network 230. One or more computing devices may also be communicatively coupled to the network 230.

Figure 3A:
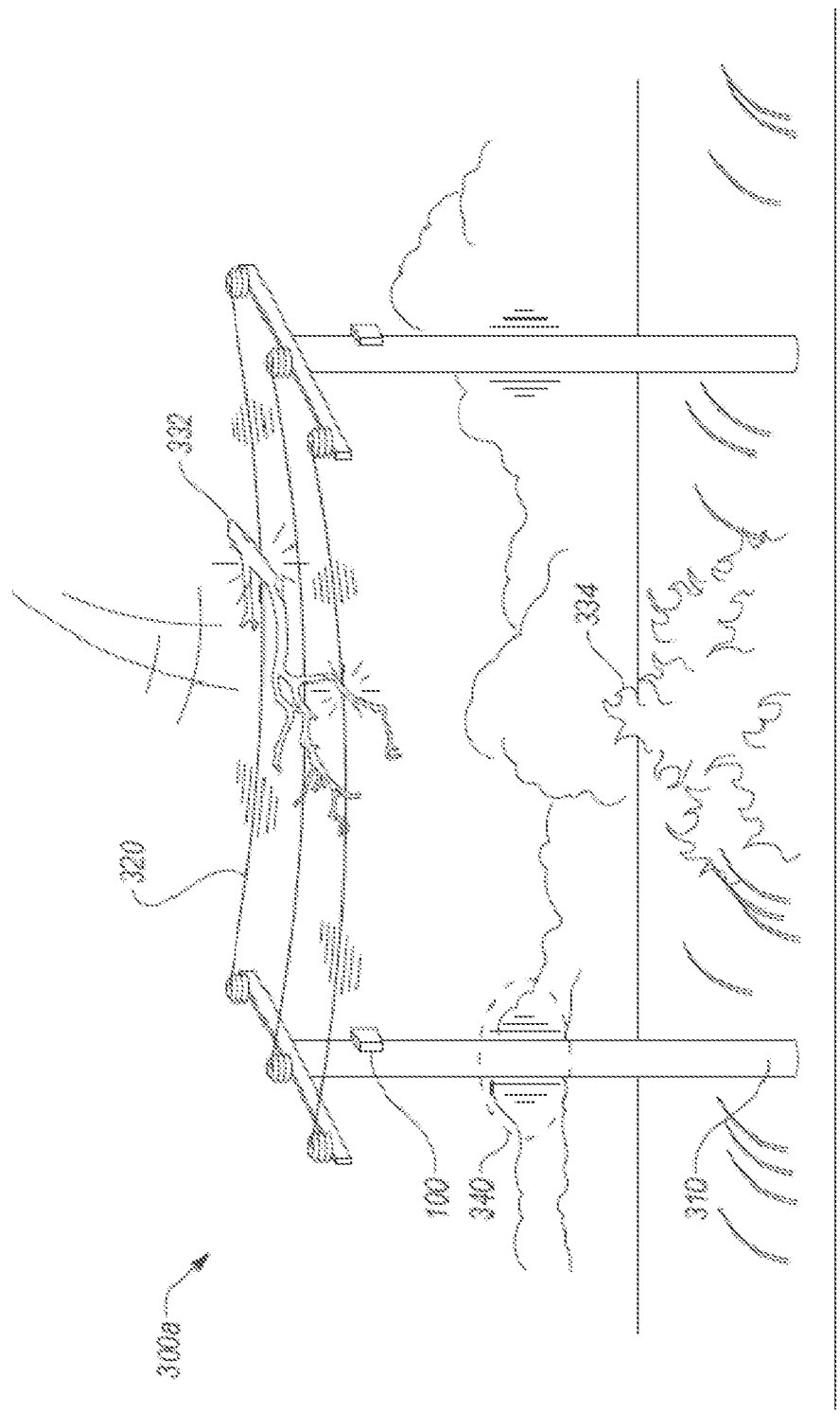
FIG. 3A illustrates a first fault detection scenario for a given utility infrastructure including the sensor device.

FIG. 3A illustrates a first fault detection scenario 300a including the sensor device 100 according to the present disclosure. The first fault detection scenario 300a may include a support structure 310 and channels 320, which may be the same as or similar to the support structure 210 and the channels 220 of the utility infrastructure 200, respectively. As such the illustrated support structure 310 may include utility poles, electricity poles, etc., and/or the illustrated channels 320 may include power lines. The first fault detection scenario 300a may include a first fault cause 332 in which a branch and/or another object contacts the channels 320. Additionally or alternatively, the first fault detection scenario 300a may include a second fault cause 334 in which a fire breaks out near the support structures 310 and/or the channels 320. The first fault cause 332 and/or the second fault cause 334 may cause vibrations 340 and/or other physical phenomena to be experienced by the utility infrastructure, which may be detected and collected by the sensor devices 100.

In some circumstances, an object may contact the channels 320 as depicted by the first fault cause 332. For example, the object may include a branch from a tree overhanging the utility infrastructure, nearby debris, wind-borne objects, passing wildlife, etc. Contact between the object and the channels 320 may cause vibrations 340 to propagate through the channels 320 and/or the support structures 310, which may be detected by the sensor devices 100. Furthermore, contact between the object and the channels 320 occurring from different directions may cause different vibration sequences. For example, branches falling on top of the channels 320 may result in different vibration patterns compared to branches thrown at the channels 320 from below.

Sensor devices 100 may detect various events that provide details about the first fault cause 332. For example, built-in cameras and/or microphones, such as the built-in cameras 142 and/or the microphones 144, may capture images and/or sound to provide additional information that improves fault detection and/or analysis. The built-in cameras may be configured to capture images responsive to collection of sensor data that may indicate the presence of or potential occurrence of faults. Additionally or alternatively, the built-in cameras may capture images at set intervals. The image data may allow a user monitoring the utility infrastructure to identify false positives and/or verify operability of the sensor devices. The built-in microphones associated with one or more of the sensor devices 100 may capture sound information that allow for further fault detection and analysis. For example, built-in microphones associated with two or more sensor devices 100 may capture sounds relating to the same event (e.g., a lightning strike) and facilitate identification of the location at which the event occurred based on differences in timing, frequency, intensity, etc. between the sounds captured by each of the sensor devices 100.

In some circumstances, environmental events may occur in the first fault detection scenario 300a as depicted by the second fault cause 334. In these and other embodiments, the second fault cause 334 may be caused by and/or otherwise related to the first fault cause 332. For example, the second fault cause 334 may include a fire breaking out near the support structures 310 and/or the channels 320. The fire may be caused by damage to the channels 320 of the utility infrastructure resulting in high-voltage arcing and ignition of nearby vegetation. The physical phenomena associated with the second fault cause 334 may be detected by the sensor devices 100. In other circumstances, the second fault scenario 334 may be unrelated to the first fault scenario 332. For example, a fire may be caused by lightning, human error, and/or other causes.

In some embodiments, the second fault cause 334 and the first fault cause 332 may occur simultaneously or within a short time period. The sensor data collected by the sensor devices 100 may correspond to physical phenomena related to the second fault cause 334 and/or the first fault cause 332. Analysis of the sensor data to determine the condition of the utility infrastructure is described in more detail below in relation to FIG. 4.

Figure 3B:
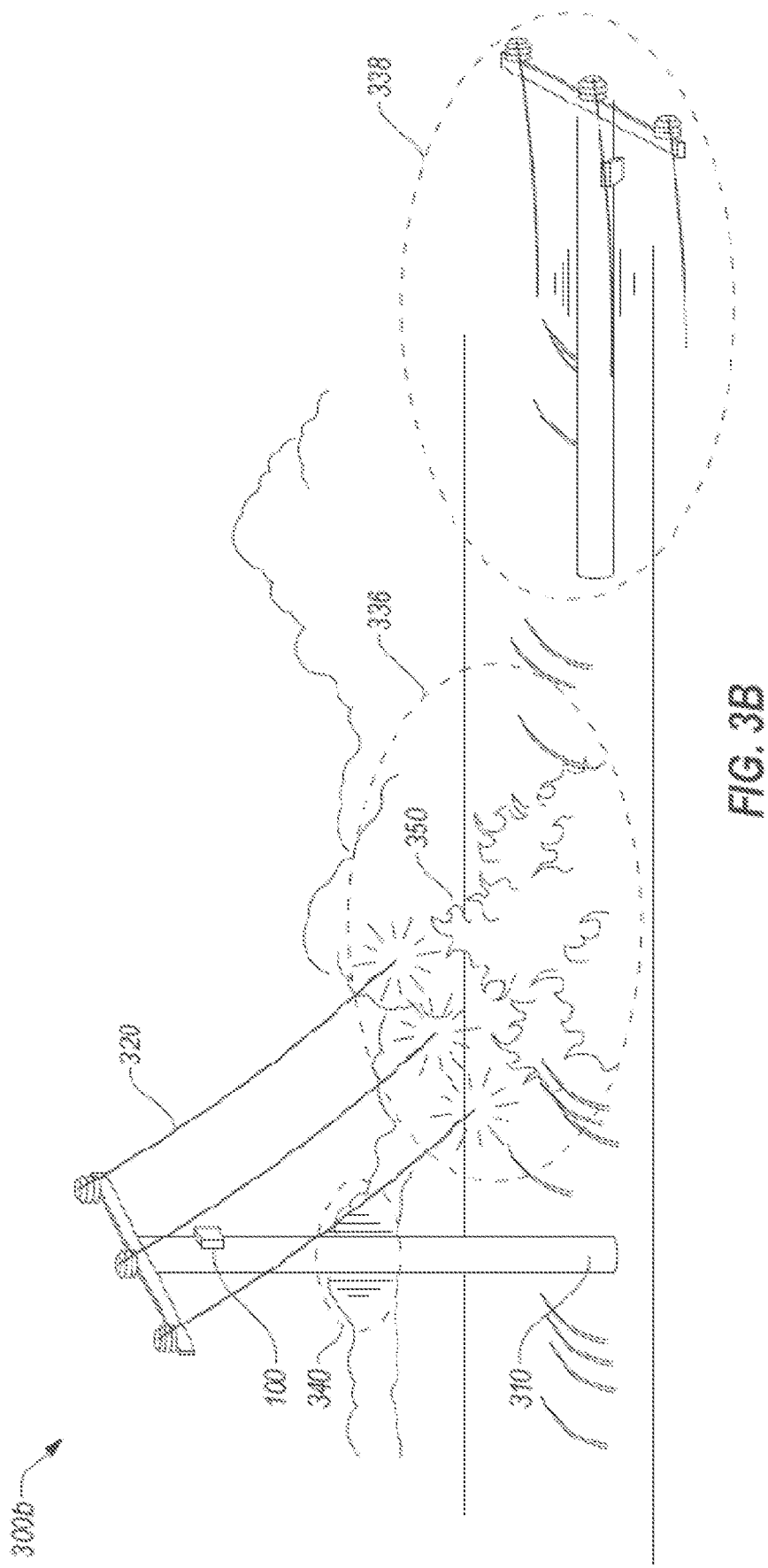
FIG. 3B illustrates a second fault detection scenario for a given utility infrastructure including the sensor device.

FIG. 3B illustrates a second fault detection scenario 300b for a given utility infrastructure including the sensor device 100 according to the present disclosure. The second fault detection scenario 300b may include a third fault cause 336 in which the channels 320 are damaged and/or disconnected. Additionally or alternatively, the second fault detection scenario 300b may include a fourth fault cause 338 in which one or more of the support structures 310 are damaged.

In some circumstances, damage to the utility infrastructure may include destruction of one or more of the channels 320 as depicted in the third fault cause 336. Destruction of the channels 320 may cause physical phenomena detectable by one or more of the sensor devices 100. In these and other embodiments, the destruction of the channels 320 may result in additional fault scenarios, such as causing fires 350. In embodiments in which one or more of the sensor devices 100 are coupled to the channels 320, the sensor devices 100 may be rendered inoperable in the third fault scenario 336. In these and other embodiments, failure of the sensor devices 100 may be detected by a processor and/or server communicatively coupled to the sensor devices 100. The failure of the sensor device 100 may be treated as sensor data that provides information about the fault scenario.

In some circumstances, damage to the utility infrastructure may include destruction of one or more support 310 structures and/or failure, de-energization, or destruction of one or more channels 320 (e.g., power lines), as depicted in the third fault scenario 336 or the fourth fault cause 338. In some embodiments, destruction of the support structures 310 and/or failure, de-energization, or destruction of the one or more channels 320 may be detectable by the sensor devices 100. For example, destruction of the support structures 310 may be detected based on gyroscopic data collected by one or more of the sensor devices 100 coupled to the destroyed support structures 310. As another example, the orientation of the support structures 310 may typically be fixed or oscillating during normal operation of the utility infrastructure, and a gyroscope included in the sensor devices 100 may detect a change in orientation of the support structures 310 corresponding to destruction of the support structure 310.

In other embodiments, destruction of one or more support structures 310 (e.g., when one or more of the support structures 310 falls/topples over or collapses) and/or failure, de-energization, or destruction of one or more channels 320 (e.g., power lines) may be detected based on electric-field (E-field) measurements or E-field data collected by the electrometer of a sensor device 100. For example, the server 240 and/or the analysis device 250 can detect that a support structure 310 has fallen or collapsed based on E-field measurements or E-field data collected by the electrometer of a sensor device 100 coupled to the support structure 310 that has fallen over. Also, for example, the server 240 and/or the analysis device 250 can detect that a support structure 310 has fallen or collapsed based on E-field measurements or E-field data collected by the electrometer of a sensor device 100 coupled to a support structure 310 coupled to the fallen/collapsed support structure 310 via channels 220. As an additional example, the server 240 and/or the analysis device 250 can detect that one or more channels 320 (e.g., power lines) has failed, de-energized, or fallen based on E-field measurements or E-field data collected by the electrometer of a sensor device 100 coupled to the one or more channels 320 or coupled to the support structure 310 supporting or otherwise connected to the one or more channels 320.

As a more specific example, the server 240 and/or the analysis device 250 can detect that a support structure 310 has fallen or collapsed when a change in the E-field measured by the electrometer of the sensor device 100 exceeds 15% (e.g., when the change in the E-field measured is approximately 25%). As another example, the server 240 and/or the analysis device 250 can detect that the one or more channels 220 have failed, de-energized, or fallen when a change in the E-field measured by the electrometer of the sensor device 100 exceeds 15% (e.g., when the change in the E-field measured is approximately 25%). The change in the E-field can be measured against a baseline value or a previously measured E-field value. The E-field can be measured in volts per meter (V/m).

Figure 4:
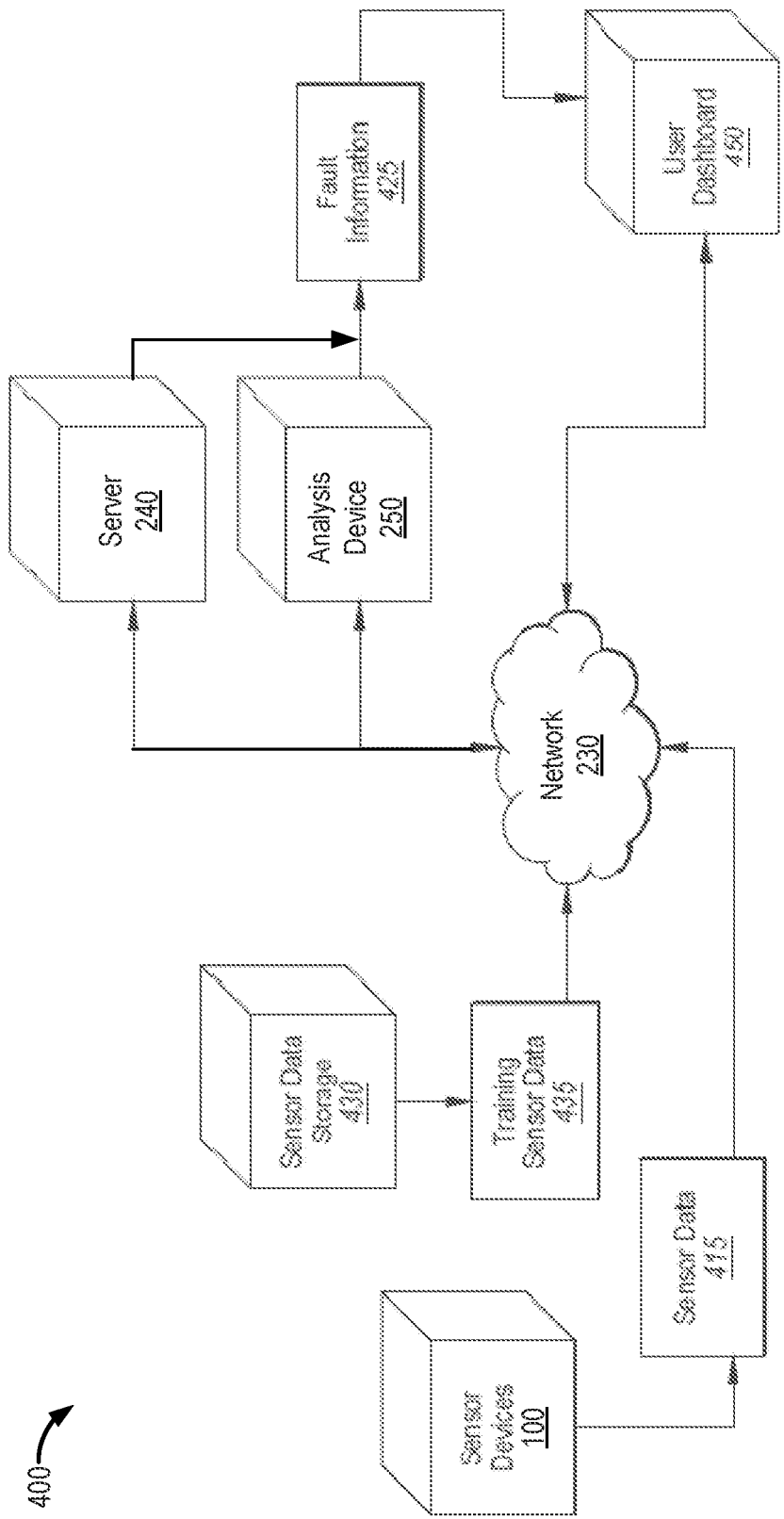
FIG. 4 is a diagram illustrating one embodiment of a system for identifying or predicting a fault occurrence.

FIG. 4 is an example system 400 illustrating sensor data collection by the sensor device and analysis of the collected sensor data according to the present disclosure. The system 400 may include a number of sensor devices 100, an analysis device 250 and/or server 240, a sensor data storage 430, a network 230, and a user dashboard 450. The sensor devices 100 may collect sensor data 415 and transmit the sensor data 415 to the server 240 and/or the analysis device 250 via the network 230. The analysis device 250 and/or the server 240 may obtain the sensor data 415 and/or the training sensor data 435 from the sensor data storage 430 (for example, via the network 230) to identify fault information 425, which may be sent to the user dashboard 450 for review by a user. The user dashboard 450 may be displayed via a computing device communicatively coupled to the network 230 such that information concerning the utility infrastructure 200 may be transmitted to and/or received through the user dashboard 450.

The sensor devices 100 may be any of the sensor devices described and shown with respect to FIGS. 1A-1E. The sensor devices 100 may be configured to collect sensor data 415 at set intervals (e.g., once per second, once every ten seconds, once per minute, etc.) and transmit the collected sensor data 415 via the network 230 such that the analysis device 250 and/or the server 240 may obtain the sensor data 415 for monitoring the utility infrastructure and prevent the utility infrastructure from failing. In some embodiments, the sensor data 415 may include structure-orientation data, gyration data, temperature data, humidity data, atmospheric pressure data, precipitation data, wind velocity data, smoke density data, particulate matter data, gas composition data, magnetic field data, electric field data, microwave radiation data, infrared radiation data, ultraviolet radiation data, visible luminosity data, electromagnetic spectroscopy data, mechanical spectroscopy data, audio data, image data, or video data relating to a given utility infrastructure 200.

In some embodiments, the sensor devices 100 may be configured to obtain automatic firmware updates via the network 230 such as from the server 240 with which the sensor devices 100 are communicatively coupled. Additionally or alternatively, the sensor devices 100 may include a rollback feature such that the sensor devices 100 are not rendered inoperable due to new firmware updates. In some embodiments, communications between the sensor devices 100 and the server 240 and/or the analysis device 250 via the network 230 may be encrypted to protect against attacks from malicious actors. Packets of information may be hashed prior to transmission and cryptographically signed and verified when received through the network 230.

The analysis device 250 may store code and routines configured to enable one or more processors to perform one or more operations. Additionally or alternatively, the analysis device 250 may be implemented using hardware including a processor, a microprocessor (e.g., to perform or control performance of one or more operations), a field-programmable gate array (FPGA), or an application-specific integrated circuit (ASIC). In some other instances, the analysis device 250 may be implemented using a combination of hardware and software. In the present disclosure, operations described as being performed by the analysis device 250 may include operations that the analysis device 250 may direct a corresponding system to perform. The analysis device 250 may be configured to perform a series of operations with respect to the sensor data 415 as described in further detail below.

In some embodiments, the analysis device 250 and/or the server 240 may identify and/or predict occurrence of one or more faults in the utility infrastructure based on the sensor data 415. The analysis device 250 and/or the server 240 may be configured to relate the sensor data 415 to the physical condition of the utility infrastructure based on heuristics, patterns, and/or rules. For example, normal operation of a given utility infrastructure may include vibrations at a given intensity and/or with a given frequency. Responsive to obtaining vibration data from one or more sensor devices 100 at the given intensity and/or with the given frequency, the analysis device 250 and/or the server 240 may determine that the condition of the given utility infrastructure is normal. As an example, in an electrical utility system, current flow through power lines of the electrical utility system may affect vibration of various components included in the electrical utility system.

Additionally or alternatively, the analysis device 250 and/or the server 240 may determine that a fault may have occurred responsive to obtaining vibration data that differs from the vibration sequence associated with normal operation. As another example, destruction of a given support structure may usually correspond to a given vibration sequence and/or change in orientation of one or more sensor devices 100 as detected by a gyroscope. Responsive to obtaining vibration data including intensity and/or frequency corresponding to the given vibration sequence and/or gyroscopic data indicating a change in orientation of the given support structure, the analysis device 250 and/or the server 240 may determine that a fault may have occurred.

In some embodiments, the analysis device 250 and/or the server 240 can determine a normal operating condition for a utility infrastructure 200 (e.g., the first utility infrastructure 200A) based on comparing the sensor data 415 associated with the utility infrastructure 200 (e.g., the first utility infrastructure 200A) to the training sensor data 435 associated with the utility infrastructure 200 (e.g., the first utility infrastructure 200A) from a previous time period and/or training sensor data 435 associated with one or more other utility infrastructures 200 (e.g., the second utility infrastructures 200B).

In some embodiments, the analysis device 250 and/or the server 240 may identify and/or predict the occurrence of weather phenomena near the utility infrastructure. In these and other embodiments, the weather phenomena may be treated as faults and/or conditions of the utility infrastructure. The sensor data 415 analyzed to identify and/or predict occurrence of weather phenomena may include metrics such as vibration data, temperature, orientation, etc. Additionally or alternatively, the sensor data 415 may include measurements indicative of weather conditions such as atmospheric pressure, humidity, etc.

For example, properties associated with wind affecting a particular utility infrastructure may be measured by the sensor device 100 based on vibration data, movement data, and/or orientation data. The sensor device 100 may be attached to a component of the particular utility infrastructure that moves responsive to being affected by wind movement, such as power lines of electrical infrastructure. Additionally or alternatively, the sensor device 100 may be suspended from a support structure associated with the particular utility infrastructure such that the sensor device 100 may move in response to wind movement. The wind speed near the particular utility infrastructure may be calculated based on vibration data and/or orientation data collected by the sensor device 100 over a given period of time. Additionally or alternatively, the wind direction may be calculated based on the direction in which the sensor device 100 moves during the given period of time. Based on the wind speed and/or the wind direction, the analysis device 250 and/or the server 240 may identify one or more weather phenomena affecting the utility infrastructure in a particular location.

In some embodiments, the analysis device 250 and/or the server 240 may be configured to assess the ambient health of the utility infrastructure. The analysis device 250 and/or the server 240 may obtain the sensor data 415 as inputs for performing calculations representing the condition of the utility infrastructure. For example, the analysis device 250 and/or the server 240 may be configured to calculate whether a given wooden support structure is affected by heart rot based on impulse data and/or vibration data. In this example, the analysis device 250 and/or the server 240 may perform discrete Fourier transforms on the impulse and/or vibration data and plot the transformed data as one or more density spectra representing the given wooden support structure. The analysis device 250 and/or the server 240 may determine whether the given wooden support structure is experiencing heart rot based on the corresponding density spectra (e.g., as determined by a machine learning model trained to recognize heart rot patterns in density spectra).

In some embodiments, identification and/or prediction of the faults of the utility infrastructure may be based on training sensor data 435. In these and other embodiments, the training sensor data 435 may include historical sensor data associated with the sensor devices 100, historical sensor data associated with other sensor devices, test-site sensor data, simulated sensor data (e.g., via a computer model), and/or sensor data associated with spatially adjacent sensors. Fault trends and/or patterns in the training sensor data 435 may be determined by a machine learning model, and the determined fault trends and/or patterns may be used to inform fault detection and prediction based on the obtained sensor data 415. In some embodiments, the machine learning model may include any suitable machine learning model, such as an artificial neural network or a support-vector machine, trained to identify and/or predict faults based on the training sensor data 435. In some embodiments, the analysis device 250, the server 240, and the sensor data storage 430 may all be communicatively coupled, such as via the network 230, such that the analysis device 250 and/or the server 240 may obtain training sensor data 435 from the sensor data storage 430.

The following describes some ways that the system 400 can identify or predict a fault occurrence associated with utility infrastructure 200. In this embodiment, the system 400 can comprise one or more sensor devices 100 coupled to a first utility infrastructure 200A (see, for example, FIG. 2). Each of the sensor devices 100 can comprise an enclosure 110 (see, e.g., FIGS. 1A-1C), one or more internal sensors 136 positioned inside the enclosure 110, one or more external sensors (e.g., the environmental sensors 134) positioned, at least partly, outside of the enclosure 110, one or more antennae (e.g., antennae of wireless communication units), and one or more energy-storage features (e.g., the battery 140). Each of the sensor devices 100 can also comprise an energy-harvesting feature such as the solar cells or solar panel 115.

One or more processors of the server 240 and/or the analysis device 250 can be programmed to execute instructions stored as part of one or more non-transitory computer-readable storage media of the server 240 or the analysis device 250, respectively. The one or more processors of the server 240 or analysis device 250 can be programmed to execute instructions to perform operations including obtaining sensor data 415 from the one or more sensor devices 100. In some embodiments, the sensor data 415 may include at least one of vibration data, impulse data, orientation data, gyration data, temperature data, humidity data, atmospheric pressure data, precipitation data, wind velocity data, smoke density data, particulate matter data, gas composition data, magnetic field data, electric field data, microwave radiation data, infrared radiation data, ultraviolet radiation data, visible luminosity data, electromagnetic spectroscopy data, mechanical spectroscopy data, audio data, image data, and video data. In certain embodiments, the sensor device(s) 100 that collected the sensor data 415 may process the sensor data 415 by identifying whether the sensor data 415 exceeds a given threshold, falls below a given threshold, equals a given value, follows a given trend, displaying a predetermined pattern, etc. to verify occurrence and/or identification of one or more faults. The sensor data 415 may be collected by the sensor device(s) 100 coupled to the first utility infrastructure 200A.

The server 240 and/or the analysis device 250 can also obtain training sensor data 435 associated with at least one of the first utility infrastructure 200A from a previous time period (e.g., stored sensor data from the past which can now be used as training sensor data 435) and at least one second utility infrastructure 200B (see, for example, FIG. 2). For example, the training sensor data 435 can be obtained from other sensor device(s) 100 coupled to the at least one second utility infrastructure 200B. Although FIG. 2 shows the second utility infrastructure 200B as being coupled to the first utility infrastructure 200A, it is contemplated by this disclosure that the second utility infrastructure 200B does not need to be coupled to the first utility infrastructure 200A.

The server 240 and/or the analysis device 250 can then compare the sensor data 415 obtained from the sensor device(s) 100 coupled to the first utility infrastructure 200A with the training sensor data 435. Comparison of the obtained sensor data 415 and the training sensor data 435

(e.g., historical sensor data or sensor data obtained from another sensor device 100 coupled to another utility infrastructure 200) may be performed based on whether the sensor data 415 exceeds a given threshold, falls below a given threshold, equals a given value, follows a given trend, displaying a predetermined pattern, etc.

The server 240 and/or the analysis device 250 can then identify or predict a utility fault occurrence based on the comparison between the sensor data 415 and the training sensor data 435. In some embodiments, the utility infrastructure faults or fault occurrences may include utility infrastructure faults that have recently occurred and/or utility infrastructure faults that are likely to occur in the future. For example, the utility infrastructure faults or fault occurrences may include generation of sparks, arcing events, weather-induced (e.g., wind-induced, rain-induced, etc.) vibrations of utility infrastructure components, other nearby weather phenomena, impact shocks from physical contact with the utility infrastructure, environmental damage (e.g., outbreak of fire or fire damage) near the utility infrastructure, etc. Also, for example, utility infrastructure faults that are likely to occur in the future may be identified based on the sensor data 415, such as transformer and/or capacitor degradation, cross-arm failure and/or fracturing, particulate matter build-up on utility infrastructure components, deterioration of the utility infrastructure due to the presence of rotten or rotting wood, weakening of electrical connections, accumulation of moisture inside transformers, increased leaning of support structures, etc.

The server 240 and/or the analysis device 250 can also transmit an alert message describing or summarizing the utility infrastructure faults or predicted faults. The alert message may be sent to a user monitoring the utility infrastructures 200 via a user dashboard 450. The user dashboard 450 may be displayed via a supervisory control and data acquisition (SCADA) system, a smartphone application, a desktop computer, a laptop computer, a tablet computer, etc. In some embodiments, the alert message may include a description of the identified and/or predicted utility infrastructure faults, sensor data 415 associated with the utility infrastructure faults, and/or recommendations on courses of action the user may take via control systems for the utility infrastructure 200.

In certain embodiments, the fault occurrence/infrastructure fault identified or predicted can be a deterioration of the first utility infrastructure 200A. For example, the deterioration of the first utility infrastructure 200A can be caused by heart rot, shell rot, and/or animal or insect damage. Also, for example, the deterioration of the first utility infrastructure 200A can be caused by accidents, natural disasters, or other environmental events.

In these embodiments, the sensor data 415 obtained from the sensor device(s) 100 can comprise vibration data including a present first oscillatory pattern of the first utility infrastructure 200A due to current flowing through channels 220 (e.g., power lines, electrical lines, etc.) supported or otherwise coupled to the first utility infrastructure 200A. Moreover, the training sensor data 435 obtained by the server 240 and/or analysis device 250 can include: (i) a previous first oscillatory pattern of the first utility infrastructure 200A obtained during a previous time period (e.g., from several days ago, several weeks ago, several months ago, and/or several years ago); (ii) a present second oscillatory pattern of a second utility infrastructure 200B due to current flowing through channels 220 supported or otherwise coupled to the second utility infrastructure 200B; and/or (iii) a previous second oscillatory pattern of the second utility infrastructure 200B due to current flowing through channels 220 supported or otherwise coupled to the second utility infrastructure 200B obtained during a previous time period (e.g., from several days ago, several weeks ago, several months ago, and/or several years ago). The server 240 and/or the analysis device 250 can identify or predict a fault occurrence associated with the first utility infrastructure 200A when the present first oscillatory pattern detected by the sensor device(s) 100 coupled to the first utility infrastructure 200A is attenuated in comparison to at least one of the previous first oscillatory pattern, the present second oscillatory pattern, and/or the previous second oscillatory pattern.

As a more specific example, at least one of the previous first oscillatory pattern, the present second oscillatory pattern, and/or the previous second oscillatory pattern can be an oscillation at a steady frequency of approximately 120 Hz. In this example, the present first oscillatory pattern can be an oscillation at a frequency of below 120 Hz. As a more specific example, the difference between the present first oscillatory pattern and the previous first oscillatory pattern, the present second oscillatory pattern, and/or the previous second oscillatory pattern can exceed a preset threshold.

In these embodiments, the sensor data 415 obtained from the sensor device(s) 100 can comprise vibration data including a present first oscillatory pattern of the first utility infrastructure 200A in response to a weather-related phenomenon (e.g., wind or rain) affecting the first utility infrastructure 200A (including channels 220—power lines, electrical lines, etc.—supported by or coupled to a support structure 210). Moreover, the training sensor data 435 obtained by the server 240 and/or analysis device 250 can include: (i) a previous first oscillatory pattern of the first utility infrastructure 200A in response to a weather-related phenomenon (e.g., wind or rain) affecting the first utility infrastructure 200A (including channels 220—power lines, electrical lines, etc.—supported by or coupled to a support structure 210) obtained during a previous time period (e.g., from several days ago, several weeks ago, several months ago, and/or several years ago); (ii) a present second oscillatory pattern of a second utility infrastructure 200B in response to a weather-related phenomenon (e.g., wind or rain) affecting the second utility infrastructure 200B (including channels 220—power lines, electrical lines, etc.—supported by or coupled to a support structure 210); and/or (iii) a previous second oscillatory pattern of the second utility infrastructure 200B in response to a weather-related phenomenon (e.g., wind or rain) affecting the second utility infrastructure 200B (including channels 220—power lines, electrical lines, etc.—supported by or coupled to a support structure 210) obtained during a previous time period (e.g., from several days ago, several weeks ago, several months ago, and/or several years ago). The server 240 and/or the analysis device 250 can identify or predict a fault occurrence associated with the first utility infrastructure 200A when the present first oscillatory pattern detected by the sensor device(s) 100 coupled to the first utility infrastructure 200A is attenuated in comparison to at least one of the previous first oscillatory pattern, the present second oscillatory pattern, and/or the previous second oscillatory pattern. As a more specific example, the difference between the present first oscillatory pattern and the previous first oscillatory pattern, the present second oscillatory pattern, and/or the previous second oscillatory pattern can exceed a preset threshold.

As a more specific example, at least one of the previous first oscillatory pattern, the present second oscillatory pattern, and/or the previous second oscillatory pattern can be an oscillation at a frequency of between 10 Hz and 50 Hz. In this example, the present first oscillatory pattern can be an oscillation at a frequency of below the previous first oscillatory pattern, the present second oscillatory pattern, and the previous second oscillatory pattern.

One technical problem faced by the applicants is how to identify or predict that the utility infrastructure (e.g., the first utility infrastructure 200A) is in a state of deterioration when the utility infrastructure shows no visible sign of deterioration or damage. One technical solution discovered and developed by the applicants is to compare a present first oscillatory pattern of the first utility infrastructure due to current flowing through channels coupled to the first utility infrastructure with at least one of a previous first oscillatory pattern of the first utility infrastructure due to current flowing through the channels obtained during the previous time period, a present second oscillatory pattern of a second utility infrastructure due to current flowing through channels coupled to the second utility infrastructure, and a previous second oscillatory pattern of the second utility infrastructure due to current flowing through channels coupled to the second utility infrastructure obtained during the previous time period to identify or predict that the utility infrastructure (e.g., the first utility infrastructure 200A) is in a state of deterioration. For example, at last one of a server and/or an analysis device can identify or predict that the utility infrastructure (e.g., the first utility infrastructure 200A) is in a state of deterioration when the present first oscillatory pattern is attenuated in comparison to at least one of the previous first oscillatory pattern, the present second oscillatory pattern, and the previous second oscillatory pattern.

Another technical solution discovered and developed by the applicants is to compare a present first oscillatory pattern of the first utility infrastructure in response to a weather-related phenomenon (e.g., wind or rain) affecting the first utility infrastructure 200A with at least one of a previous first oscillatory pattern of the first utility infrastructure in response to a weather-related phenomenon (e.g., wind or rain) affecting the first utility infrastructure 200A obtained during the previous time period, a present second oscillatory pattern of a second utility infrastructure in response to a weather-related phenomenon (e.g., wind or rain) affecting the second utility infrastructure 200B, and a previous second oscillatory pattern of the second utility infrastructure in response to a weather-related phenomenon (e.g., wind or rain) affecting the second utility infrastructure 200B obtained during the previous time period to identify or predict that the utility infrastructure (e.g., the first utility infrastructure 200A) is in a state of deterioration. For example, at last one of a server and/or an analysis device can identify or predict that the utility infrastructure (e.g., the first utility infrastructure 200A) is in a state of deterioration when the present first oscillatory pattern is attenuated in comparison to at least one of the previous first oscillatory pattern, the present second oscillatory pattern, and the previous second oscillatory pattern. The sensor device(s) 100 disclosed herein are especially well-equipped to undertake such measurements given that the sensor device(s) 100 comprise sensors that can measure the various oscillatory patterns and weather-related phenomena.

In some embodiments, one or more fault occurrences may be identified or predicted by at least one of analog signal processing and/or digital signal processing of the sensor data 415 and the training sensor data 435. The fault occurrences may be identified or predicted by comparing the processed sensor data 415 against the processed training data 435. In other embodiments, the fault occurrences may be identified or predicted by a machine learning model trained based on the training sensor data associated with the second utility infrastructures.

The training sensor data 435 may include information identifying faults associated with the training sensor data 435 and/or faults that occurred subsequent to collection of the training sensor data 435 such that the analysis device 250 and/or the server 240 may compare the obtained sensor data 415 to the training sensor data 435 to facilitate identification and/or prediction of faults. For example, one or more faults may be induced in a model and/or a simulation of a given utility infrastructure, and sensor data obtained based on the model and/or the simulation may be provided as training data for the machine learning model. As another example, one or more faults associated with sensors spatially adjacent to the sensor devices 100 (e.g., sensors coupled to nearby support structures) may have been previously identified. The sensor data associated with the spatially adjacent sensors may be provided as training data for the machine learning model for comparison with sensor data 415 obtained by the sensor devices 100. In these and other examples, the spatially adjacent sensor data may be considered a subset of the training sensor data 435. Additionally or alternatively, the spatially adjacent sensor data may be obtained concurrently with the sensor data 415 associated with the sensor devices 100.

In certain embodiments, a fault occurrence of the first utility infrastructure can be identified or predicted by feeding sensor data 415 to at least one of a supervised learning model and an unsupervised learning model and obtaining a prediction from at least one of the supervised learning model and the unsupervised learning model concerning the fault occurrence. The supervised learning model and the unsupervised learning model can be trained using the training sensor data 435 obtained from the first utility infrastructure during a previous time period or training sensor data 435 obtained from a second utility infrastructure during a previous time period or a present time period (i.e., in real-time or near-real-time).

In some embodiments, the fault information 425 and/or the sensor data 415 may be stored in the sensor data storage 430. Additionally or alternatively, the fault information and/or the sensor data may be transmitted to the user dashboard 450 for display and/or storage.

The user dashboard 450 may refer to code and routines configured to enable a computing system to perform one or more operations. Additionally or alternatively, the user dashboard 450 may be displayed on a computing device implemented using hardware including a processor, a microprocessor (e.g., to perform or control performance of one or more operations), a field-programmable gate array (FPGA), or an application-specific integrated circuit (ASIC). In some other instances, the user dashboard 450 may be displayed on a computing device implemented using a combination of hardware and software.

The user dashboard 450 may present an interface with which a supervising user may monitor obtained sensor data, review fault-detection results, and/or interact with the utility infrastructure. In some embodiments, the user dashboard 450 may generate periodic reports summarizing the condition of the utility infrastructure based on the sensor data and fault information provided to the user dashboard 450. In these and other embodiments, sensor data 415, training sensor data 435, and/or fault information 425 displayed via the user dashboard 450 may be downloaded by the user and/or stored in a third-party data storage.

Modifications, additions, or omissions may be made to the system 400 without departing from the scope of the disclosure. For example, the designations of different elements in the manner described is meant to help explain concepts described herein and is not limiting. For instance, in some embodiments, the sensor devices 100, the analysis device 250, the server 240, and/or the sensor data storage 430, the network 230, and the user dashboard 450 are delineated in the specific manner described to help with explaining concepts described herein but such delineation is not meant to be limiting. Further, the system 400 may include any number of other elements or may be implemented within other systems or contexts than those described.

Figure 5:
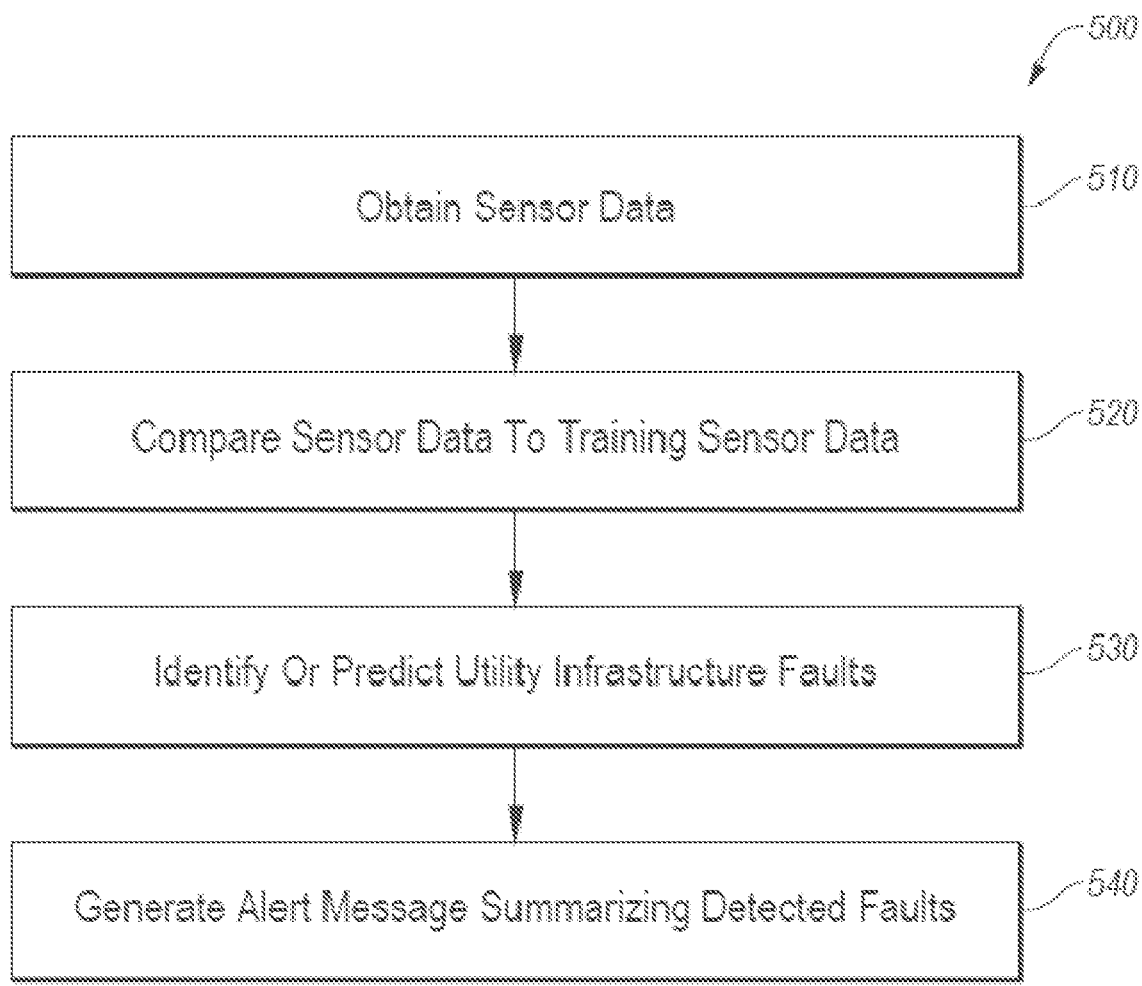
FIG. 5 is a flowchart illustrating an embodiment of a method for identifying or predicting a fault occurrence.

FIG. 5 is a flowchart of an example method 500 of sensor data collection and analysis according to the present disclosure. The method 500 may be performed by any suitable system, apparatus, or device. For example, the analysis device 250 and/or the server 240 may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 510, where sensor data 415 may be obtained by the server 240 and/or the analysis device 250 from one or more sensor devices 100. In some embodiments, the sensor data 415 may include at least one of vibration data, impulse data, orientation data, gyration data, temperature data, humidity data, atmospheric pressure data, precipitation data, wind velocity data, smoke density data, particulate matter data, gas composition data, magnetic field data, electric field data, microwave radiation data, infrared radiation data, ultraviolet radiation data, visible luminosity data, electromagnetic spectroscopy data, mechanical spectroscopy data, audio data, image data, and video data. In some embodiments, the sensor device(s) 100 that collected the sensor data 415 may process the sensor data 415 by identifying whether the sensor data 415 exceeds a given threshold, falls below a given threshold, equals a given value, follows a given trend, displaying a predetermined pattern, etc. to verify occurrence and/or identification of one or more faults. The sensor data 415 may be collected by the sensor device(s) 100 coupled to the utility infrastructure 200 as described above in relation to FIGS. 1A, 1B, 1C, 1D, 1E, 2, 3A, and 3B.

At block 520, the obtained sensor data 415 may be compared to training sensor data 435. In some embodiments, the training sensor data 435 may be obtained from the same sensor device(s) 100 coupled to the utility infrastructure 200 (e.g., the first utility infrastructure 200A, see FIG. 2) from a previous time period (e.g., stored sensor data from the past which can now be used as training sensor data 435). In these and other embodiments, the training sensor data 435 may also be obtained from other sensor device(s) 100 coupled to one or more other utility infrastructures 200 (e.g., the second utility infrastructure 200B, see FIG. 2). In certain embodiments, comparison of the obtained sensor data 415 and the training sensor data 435 (e.g., historical sensor data or sensor data obtained from another sensor device 100 coupled to another utility infrastructure 200) may be performed as described above in relation to FIG. 4.

At block 530, one or more utility infrastructure faults or fault occurrences may be identified and/or predicted based on the comparison between the sensor data 415 and the training sensor data 435. In some embodiments, the utility infrastructure faults or fault occurrences may include utility infrastructure faults that have recently occurred and/or utility infrastructure faults that are likely to occur in the future. For example, the utility infrastructure faults or fault occurrences may include generation of sparks, arcing events, weather-induced (e.g., wind-induced, rain-induced, etc.) vibrations of utility infrastructure components, other nearby weather conditions, impact shocks from physical contact with the utility infrastructure, environmental damage (e.g., outbreak of fire or fire damage) near the utility infrastructure, etc. Also, for example, utility infrastructure faults that are likely to occur in the future may be identified based on the sensor data 415, such as transformer and/or capacitor degradation, cross-arm failure and/or fracturing, particulate matter build-up on utility infrastructure components, deterioration of the utility infrastructure due to the presence of rotten or rotting wood, weakening of electrical connections, accumulation of moisture inside transformers, increased leaning of support structures, etc.

At block 540, an alert message may be generated summarizing the utility infrastructure faults. The alert message may be sent to a user monitoring the utility infrastructure via a user dashboard 450. The user dashboard 450 may be displayed via a supervisory control and data acquisition (SCADA) system, a smartphone application, a desktop computer, a laptop computer, a tablet computer, etc. In some embodiments, the alert message may include a description of the identified and/or predicted utility infrastructure faults, sensor data 415 associated with the utility infrastructure faults, and/or recommendations on courses of action the user may take via control systems for the utility infrastructure 200.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
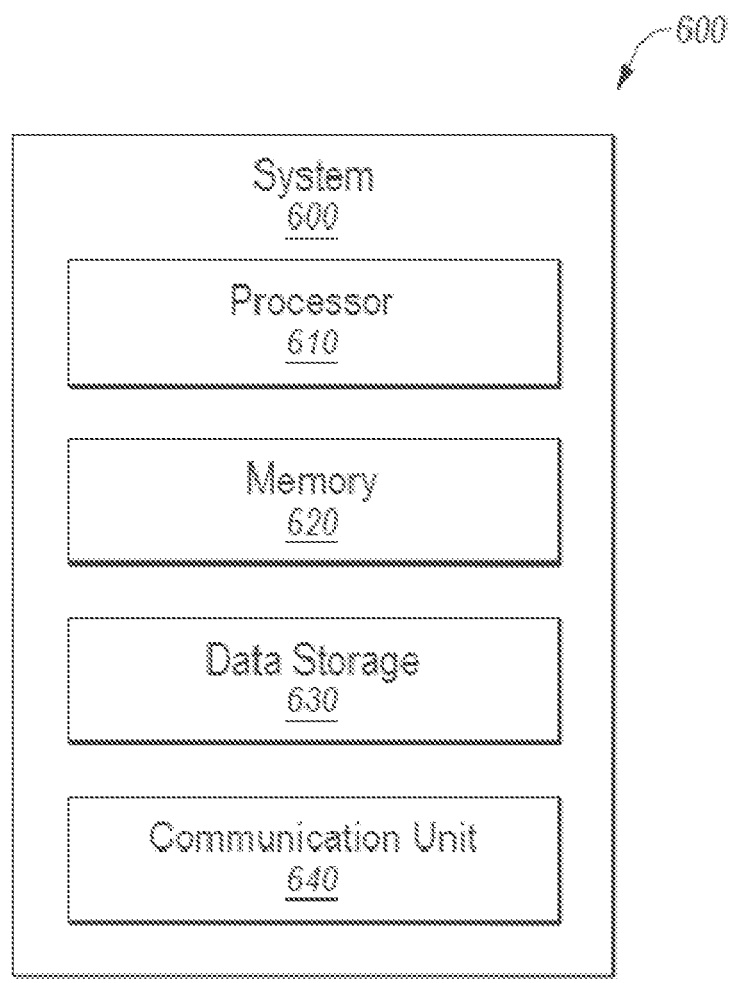
FIG. 6 is an example computing system.

FIG. 6 illustrates an example computing system 600, according to at least one embodiment described in the present disclosure. The computing system 600 may include a processor 610, a memory 620, a data storage 630, and/or a communication unit 640, which all may be communicatively coupled. Any or all of the devices or servers included as part of the system 400 of FIG. 4 may be implemented as the computing system 600, including the sensor devices 100, the analysis device 250, the server 240, the sensor data storage 430, and/or the computing device displaying the user dashboard 450.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform the method 500 of FIG. 5. For example, the processor 610 may obtain instructions regarding obtaining sensor data, comparing sensor data to training sensor data, identifying or predicting utility infrastructure faults, and/or generating alert messages summarizing detected faults.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. For example, the memory 620 and/or the data storage 630 may store obtained sensor data (such as the sensor data 415 of FIG. 4). In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

What is claimed is:

1. A method of identifying or predicting a fault occurrence, comprising:
    obtaining, at a server or an analysis device, sensor data comprising vibration data from one or more sensor devices communicatively coupled to the server, wherein the one or more sensor devices are coupled to a first utility infrastructure, wherein each of the one or more sensor devices comprises solar cells and a battery;
    in response to a failure of the solar cells, providing energy to the sensor device from the battery;
    obtaining, at the server or the analysis device, training sensor data associated with at least one of the first utility infrastructure from a previous time period and one or more second utility infrastructures;
    comparing, using one or more processors of the server or the analysis device, the sensor data with the training sensor data associated with the at least one of the first utility infrastructure from the previous time period and the one or more second utility infrastructures; and
    identifying or predicting, using the one or more processors of the server or the analysis device, a fault occurrence associated with the first utility infrastructure based on comparing the sensor data associated with the first utility infrastructure to the training sensor data associated with the at least one of the first utility infrastructure from the previous time period and the one or more second utility infrastructures, wherein the fault occurrence comprises a deterioration of the first utility infrastructure, wherein the vibration data obtained from the one or more sensor devices comprises a present first oscillatory pattern of the first utility infrastructure due to current flowing through channels coupled to the first utility infrastructure, wherein the training sensor data comprises at least one of a previous first oscillatory pattern of the first utility infrastructure due to current flowing through the channels obtained during the previous time period, a present second oscillatory pattern of a second utility infrastructure due to current flowing through channels coupled to the second utility infrastructure, and a previous second oscillatory pattern of the second utility infrastructure due to current flowing through channels coupled to the second utility infrastructure and obtained during the previous time period, wherein at least one of the previous first oscillatory pattern, the present second oscillatory pattern, and the previous second oscillatory pattern is an oscillation at a frequency between 10 Hz and 50 Hz, and wherein the fault occurrence is identified or predicted when the present first oscillatory pattern is at a frequency below the at least one of the previous first oscillatory pattern, the present second oscillatory pattern, and the previous second oscillatory pattern.

2. The method of claim 1, further comprising transmitting a message to a computing device describing the fault occurrence of the first utility infrastructure or summarizing a condition of the first utility infrastructure.

3. The method of claim 1, wherein at least one of the one or more sensor devices comprises:
an enclosure;
one or more internal sensors positioned inside of the enclosure, one or more external sensors positioned at least partly outside of the enclosure, or a combination thereof;
one or more antennae; and
one or more energy-storage features.

4. The method of claim 1, wherein at least one of the one or more sensor devices comprises a vibrometer.

5. The method of claim 4, wherein the at least one of the one or more sensor devices further comprises at least one of an accelerometer, a gyroscope, an acoustic microphone, a video camera, an ambient temperature sensor, a barometer, a hygrometer, a magnetometer, a smoke detector, a visible light meter or photometer, an ultraviolet (UV) light detector, an infrared (IR) light detector, an anemometer or wind sensor, a particulate meter or counter, an electrometer, a multi-field electromagnetic field (EMF) meter, a radio frequency (RF) meter, and a spectrometer.

6. The method of claim 1, wherein the sensor data further comprises at least one of structure-orientation data, gyration data, temperature data, humidity data, atmospheric pressure data, precipitation data, wind velocity data, smoke density data, particulate matter data, gas composition data, magnetic field data, electric field data, microwave radiation data, infrared radiation data, ultraviolet radiation data, visible luminosity data, electromagnetic spectroscopy data, mechanical spectroscopy data, audio data, image data, and video data relating to the utility infrastructure.

7. The method of claim 1, wherein the fault occurrence of the first utility infrastructure is identified or predicted by feeding the sensor data to at least one of a supervised learning model and an unsupervised learning model and obtaining a prediction from the at least one of the supervised learning model and the unsupervised learning model concerning the fault occurrence, and wherein the supervised learning model and the unsupervised learning models are trained using the training sensor data.

8. The method of claim 1, wherein at least one of the one or more sensor devices is coupled to the first utility infrastructure at a position at least 3.0 meters above ground level.

9. The method of claim 1, wherein at least one of the one or more sensor devices is coupled to the first utility infrastructure via a bracket fixedly fastened to an exterior side of the first utility infrastructure, and wherein at least one of a vibration sustained by the first utility infrastructure or a channel coupled to the first utility infrastructure is passed through the first utility infrastructure via the bracket to each of the one or more sensor devices.

10. The method of claim 1, wherein the first utility infrastructure is made in part of wood and wherein the deterioration of the first utility infrastructure is caused by at least one of heart rot, rot caused by an insect or animal, and termite damage of the wood making up at least part of the first utility infrastructure.

11. A non-transitory computer-readable medium comprising instructions stored thereon that when executed on a processor perform the steps of:
obtaining sensor data comprising vibration data from one or more sensor devices communicatively coupled to the server, wherein the one or more sensor devices are coupled to a first utility infrastructure, wherein each of the one or more sensor devices comprises solar cells and a battery;
in response to a failure of the solar cells, providing energy to the sensor device from the battery;
obtaining training sensor data associated with at least one of the first utility infrastructure from a previous time period and one or more second utility infrastructures;
comparing the sensor data with the training sensor data associated with the at least one of the first utility infrastructure from the previous time period and the one or more second utility infrastructures; and
identifying or predicting a fault occurrence associated with the first utility infrastructure based on comparing the sensor data associated with the first utility infrastructure to the training sensor data associated with the at least one of the first utility infrastructure from the previous time period and the one or more second utility infrastructures, wherein the fault occurrence comprises a deterioration of the first utility infrastructure, wherein the vibration data obtained from the one or more sensor devices comprises a present first oscillatory pattern of the first utility infrastructure due to current flowing through channels coupled to the first utility infrastructure, wherein the training sensor data comprises at least one of a previous first oscillatory pattern of the first utility infrastructure due to current flowing through the channels obtained during the previous time period, a present second oscillatory pattern of a second utility infrastructure due to current flowing through channels coupled to the second utility infrastructure, and a previous second oscillatory pattern of the second utility infrastructure due to current flowing through channels coupled to the second utility infrastructure and obtained during the previous time period, wherein at least one of the previous first oscillatory pattern, the present second oscillatory pattern, and the previous second oscillatory pattern is an oscillation at a frequency between 10 Hz and 50 Hz, and wherein the fault occurrence is identified or predicted when the present first oscillatory pattern is at a frequency below the at least one of the previous first oscillatory pattern, the present second oscillatory pattern, and the previous second oscillatory pattern.

12. The non-transitory computer-readable medium of claim 11, further comprising instructions thereon that when executed on a processor perform the step of transmitting a message to a computing device describing the fault occurrence of the first utility infrastructure or summarizing a condition of the first utility infrastructure.

13. The non-transitory computer-readable medium of claim 11, wherein at least one of the one or more sensor devices comprises:
an enclosure;
one or more internal sensors positioned inside of the enclosure, one or more external sensors positioned at least partly outside of the enclosure, or a combination thereof;
one or more antennae; and
one or more energy-storage features.

14. The non-transitory computer-readable medium of claim 11, wherein at least one of the one or more sensor devices comprises a vibrometer.

15. The non-transitory computer-readable medium of claim 14, wherein the at least one of the one or more sensor devices further comprises at least one of an accelerometer, a gyroscope, an acoustic microphone, a video camera, an ambient temperature sensor, a barometer, a hygrometer, a magnetometer, a smoke detector, a visible light meter or photometer, an ultraviolet (UV) light detector, an infrared (IR) light detector, an anemometer or wind sensor, a particulate meter or counter, an electrometer, a multi-field electromagnetic field (EMF) meter, a radio frequency (RF) meter, and a spectrometer.

16. The non-transitory computer-readable medium of claim 11, wherein the sensor data further comprises at least one of structure-orientation data, gyration data, temperature data, humidity data, atmospheric pressure data, precipitation data, wind velocity data, smoke density data, particulate matter data, gas composition data, magnetic field data, electric field data, microwave radiation data, infrared radiation data, ultraviolet radiation data, visible luminosity data, electromagnetic spectroscopy data, mechanical spectroscopy data, audio data, image data, and video data relating to the utility infrastructure.

17. The non-transitory computer-readable medium of claim 11, wherein the fault occurrence of the first utility infrastructure is identified or predicted by feeding the sensor data to at least one of a supervised learning model and an unsupervised learning model and obtaining a prediction from the at least one of the supervised learning model and the unsupervised learning model concerning the fault occurrence, and wherein the supervised learning model and the unsupervised learning models are trained using the training sensor data.

18. The non-transitory computer-readable medium of claim 11, wherein at least one of the one or more sensor devices is coupled to the first utility infrastructure at a position at least 3.0 meters above ground level.

19. The non-transitory computer-readable medium of claim 11, wherein at least one of the one or more sensor devices is coupled to the first utility infrastructure via a bracket fixedly fastened to an exterior side of the first utility infrastructure, and wherein at least one of a vibration sustained by the first utility infrastructure or a channel coupled to the first utility infrastructure is passed through the first utility infrastructure via the bracket to each of the one or more sensor devices.

20. The non-transitory computer-readable medium of claim 11, wherein the first utility infrastructure is made in part of wood and wherein the deterioration of the first utility infrastructure is caused by at least one of heart rot, rot caused by an insect or animal, and termite damage of the wood making up at least part of the first utility infrastructure.

* * * * *